(12) United States Patent
Tran

(10) Patent No.: US 10,747,415 B2
(45) Date of Patent: *Aug. 18, 2020

(54) FLUID TIMELINE SOCIAL NETWORK

(71) Applicant: Thinh Tran, Kirkland, WA (US)

(72) Inventor: Thinh Tran, Kirkland, WA (US)

(73) Assignee: Thinh Tran, Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,859

(22) Filed: Aug. 23, 2019

(65) Prior Publication Data

US 2019/0377778 A1  Dec. 12, 2019

Related U.S. Application Data

(63) Continuation of application No. 16/300,028, filed as application No. PCT/US2017/032037 on May 10, 2017.

(60) Provisional application No. 62/334,318, filed on May 10, 2016.

(51) Int. Cl.
| | |
|---|---|
| *G06F 3/0485* | (2013.01) |
| *G06Q 50/00* | (2012.01) |
| *G06F 16/9537* | (2019.01) |
| *G06F 40/106* | (2020.01) |
| *H04L 12/58* | (2006.01) |

(52) U.S. Cl.
CPC ........ *G06F 3/0485* (2013.01); *G06F 16/9537* (2019.01); *G06F 40/106* (2020.01); *G06Q 50/01* (2013.01); *H04L 51/32* (2013.01)

(58) Field of Classification Search
CPC .............................. G06F 3/0485; G06Q 50/01
See application file for complete search history.

(56) References Cited

U.S. PATENT DOCUMENTS

| | | | | |
|---|---|---|---|---|
| 8,793,579 B2 * | 7/2014 | Halliday | ............... | G06Q 10/10 |
| | | | | 715/711 |
| 8,990,255 B2 * | 3/2015 | Metsatahti | .......... | G06Q 10/109 |
| | | | | 707/791 |
| 2003/0095149 A1 * | 5/2003 | Fredriksson | .......... | G06F 3/0481 |
| | | | | 715/797 |

(Continued)

OTHER PUBLICATIONS

International Search Report and Written Opinion, dated Aug. 10, 2017, for International Application No. PCT/US2017/032037, 14 pages.

(Continued)

*Primary Examiner* — Ryan Barrett
(74) *Attorney, Agent, or Firm* — Seed IP Law Group LLP

(57) ABSTRACT

A fluid timeline social network is provided herein. The fluid timeline social network includes a story database, an image database and a fluid timeline social network application, hosted at least partially on a server computer including a processor and a computer-readable storage medium. The fluid timeline social network application is configured to receive from a user computer device a created story, the created story including at least one of textual information and image information; receive from the user computer device a user-specified date to be associated with the created story; associate the created story with the user-specified date; associate the created story with an actual time and date that the created story is received by the fluid timeline social network application; and provide the story to the story database for storage.

15 Claims, 15 Drawing Sheets

(56) References Cited

U.S. PATENT DOCUMENTS

| | | | |
|---|---|---|---|
| 2004/0021673 A1* | 2/2004 | Alessi | G06F 3/0481 345/619 |
| 2004/0125150 A1* | 7/2004 | Adcock | G06F 16/54 715/810 |
| 2005/0091596 A1* | 4/2005 | Anthony | G06F 3/04815 715/712 |
| 2005/0114781 A1* | 5/2005 | Brownholtz | G06F 3/0482 715/733 |
| 2005/0154988 A1* | 7/2005 | Proehl | G06F 3/0362 715/720 |
| 2005/0210410 A1* | 9/2005 | Ohwa | G06F 3/0482 715/821 |
| 2007/0061748 A1* | 3/2007 | Hirose | G06F 3/0481 715/764 |
| 2008/0294663 A1 | 11/2008 | Heinley et al. | |
| 2009/0150822 A1* | 6/2009 | Miller | G06F 3/0485 715/784 |
| 2010/0077355 A1* | 3/2010 | Belinsky | G06F 3/0482 715/835 |
| 2010/0095238 A1* | 4/2010 | Baudet | G06F 3/0481 715/784 |
| 2011/0004662 A1* | 1/2011 | Dodsworth | G06Q 10/10 709/206 |
| 2013/0024803 A1* | 1/2013 | Workman | G06F 3/04886 715/781 |
| 2013/0073984 A1 | 3/2013 | Lessin et al. | |
| 2013/0157234 A1 | 6/2013 | Gulli et al. | |
| 2013/0290430 A1 | 10/2013 | Yung et al. | |
| 2014/0013243 A1 | 1/2014 | Flynn, III et al. | |
| 2014/0040379 A1 | 2/2014 | Sittig et al. | |
| 2014/0089816 A1 | 3/2014 | DiPersia et al. | |
| 2014/0324797 A1 | 10/2014 | Yung et al. | |
| 2015/0120766 A1* | 4/2015 | Hamilton | G06F 16/335 707/754 |
| 2015/0220264 A1* | 8/2015 | Lewis | H04N 21/4825 715/716 |
| 2015/0378556 A1* | 12/2015 | Ramanathan | G06F 3/0481 715/765 |
| 2016/0274785 A1* | 9/2016 | Tolia | H04W 4/21 |
| 2016/0364085 A1* | 12/2016 | Henderson | G06F 3/0486 |
| 2017/0169800 A1* | 6/2017 | Greco | G06F 3/0482 |
| 2019/0147017 A1* | 5/2019 | Tran | G06F 17/212 715/720 |

OTHER PUBLICATIONS

International Preliminary Report on Patentability, dated Nov. 13, 2018, for International Application No. PCT/US2017/032037, 10 pages.

* cited by examiner

FLUID TIMELINE SOCIAL NETWORK

BACKGROUND

Technical Field

The present application pertains to social media networks, and more particularly to a fluid timeline, time-based social network that orders posted content based on the time it was posted as well as a user-specified date to be associated with the content.

Description of the Related Art

Social media networks have been around for many years and they are very popular. Some social media networks have millions, tens of millions, and even hundreds of millions of daily users. Many social media networks, such as FACE-BOOK, TWITTER, INSTAGRAM, and the like, allow users to generate content, which may then be posted or otherwise provided to a user's network of friends, followers, and others.

The user-generated content is typically displayed to users as part of a "wall" or "feed" of posted content. Users scroll through the feed backward in time starting from the current time. That is, the most recently posted content from within any particular user's network is generally displayed at the top of the wall or feed, while the oldest content is not displayed at all. To reach the older and oldest content, the user has to scroll through a large amount of intervening content, which has also been posted at some particular time in the past.

Further, content posted in conventional social media networks is displayed solely as of the time and date that the content was posted. Thus, content of a particular user's feed is only be displayed as of the time and date that the content was posted.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

The use of conventional social networks and methodologies to develop social network architectures has led to the discovery of a significant drawback with the conventional approach. The user experience provided by conventional social networks heretofore been an iterative and inefficient process. Each portion of user-generated content is stored by the date it is uploaded to the social network, and the ability to find or re-find previously stored content is monotonous, inefficient, and in some cases impossible. Even when a social networking user knows that certain content is stored in the social network's server architecture, it is often very difficult to search or scroll through other content to locate the material of interest.

The present disclosure, in part, addresses a desire for a more intuitive, user-friendly time-based social network application. More particularly, the present disclosure provides a time-based social media network architecture that allows users to post "stories" (e.g., image, video, text, other such objects or information) that will be presented (e.g., played, displayed, read, tactually delivered, or presented in other ways) to one or more users at any desired time (e.g., a time in the present, past, or future). Users, via a computing device (e.g., smartphone, tablet, laptop, wearable computing device, desktop computing device, kiosk, etc.), are exposed to a story "feed" that may include some or all of the particular user's own posted stories, as well as stories posted by other users within the particular user's network (e.g., friends). Each feed is arranged in at least two ways.

In a first "browsing mode," for example, users may scroll horizontally to view time periods of interest, with each time period (e.g., days, weeks, months, years, etc.) represented along a horizontal timeline. As such, users may quickly and efficiently scroll to a particular time period. Then, the user may select that time period to enter the second "reading mode" to view or otherwise access all of the stories within the user's feed that are associated with that time period.

In the second reading mode, once a time period has been selected, the user's feed presents all of the stories within that particular time period along a vertically-arranged timeline. In some embodiments, the most recently created stories are displayed toward one end of the vertical timeline (e.g., the top end), while the oldest stories are displayed toward the other end of the vertical timeline (e.g., the bottom end). In other embodiments, the vertical ordering is arranged according to a different parameter such as proximity to a particular geographic location, topical subject matter (e.g., food, travel, sports, items for sale, or any other such topic), or some other parameter.

When users create a story within the fluid timeline social network, the user may assign any past date, present date, or future date to that story. Based on the user-specified date, the story will appear in the user's feed, as well as the feed of any other user having access to the particular story, as having occurred or expecting to occur at the date, time, or date and time specified by the user.

In a first embodiment, a method organizes a time-based social network in a computing server architecture. The computing server architecture has one or more processor cores arranged to execute instructions stored in associated memory, and the instructions are directed by requests received from a plurality of remote computing devices. The method includes the acts of receiving a plurality of stories generated by users of the time-based social network, each story associated with a user-specified date, assigning a different system-wide unique number to each of the received plurality of stories, and storing each of the received plurality of stories in memory and, based on its assigned system-wide unique number, associating each of the received plurality of stories with a user, a time-date stamp, and the user-specified date. The method also includes the acts of feeding to a first user remote computing device a plurality of stories, the plurality of stories arranged for presentation based on the user-specified date accepting input directions from the first user remote computing device, the input directions arranged to request one or more sequenced stories, each of the one or more sequenced stories associated with a same selected date, the input directions further arranged to change the selected date to a different selected date.

In at least some case of the first embodiment, storing each of the received plurality of stories in memory includes further associating each of the received plurality of stories with a geographic location, and in at least some cases, storing each of the received plurality of stories in memory includes further associating each of the received plurality of stories with a user-specified topic. In these or in other cases of the first embodiment, storing each of the received plurality of stories in memory includes further associating each of the received plurality of stories with a system-determined topic, and in some cases, the time-date stamp is an actual time and date that the created story is received by a determined node of the computing server architecture.

Sometimes, in cases of the first embodiment, the one or more sequenced stories are sequenced based on the time-date stamp and stories that are more recent in time are fed before stories that are more distant in time, and sometimes, the one or more sequenced stories are sequenced based on a current reported location of the first user remote computing device and stories that are closer in proximity to the current reported location are fed before stories that are further away from the current reported location.

In at least some cases, acts of the first embodiment also include, based on a change of the selected date to the different selected date, feeding to the first user remote computing device a second plurality of stories, the second plurality of stories arranged for presentation based on the different selected date. In at least some of the cases that act based on a change of the selected date to the different selected date, the second plurality of stories includes a second sequence of stories, each of the stories in the second sequence being associated with a different selected date that is progressively closer to the different selected date, and in at least some of these cases, upon sending a first story associated with the different selected date, the method includes feeding to the first user remote computing device a third plurality of stories, the third plurality of stories arranged for presentation based on the different selected date, wherein each of the third plurality of stories is one of a sequence of stories associated with the different selected date.

In a second embodiment, a method to interact with a time-based social network that is arranged to operate in a computing server architecture is disclosed. The method is implemented on a mobile computing device having at least one processor arranged to execute instructions stored in a non-transitory computer readable media associated with the at least one processor, and the method includes the act of forming a communicative relationship with the computing server architecture, wherein the computing server architecture is arranged to access a database architecture that stores a plurality of stories generated by users of the time-based social network, each story of the plurality of stories associated with a user-specified date. The method also includes the acts of communicating a user-selected date to the computing server architecture, and receiving at the mobile computing device a plurality of stories, the plurality of stories arranged for horizontally and vertically scrollable presentation based on the user-selected date.

In some cases of the second embodiment, the method includes presenting the plurality of stories based on the user-selected date such that stories associated with the user-selected date are vertically presented in a primary focus area of a display of the mobile computing device and stories not associated with the user-selected date are vertically presented in one or more secondary focus areas of the display of the mobile computing device, and in some of these cases, the method also includes the acts of accepting vertical scrolling information, the vertical scrolling information arranged to request a first sequence of stories, each story of the first sequence associated with a same selected date, receiving stories of the first sequence from the computing server architecture, and vertically presenting the received stories of the requested first sequence in the primary focus area of the display of the mobile computing device.

In some cases of the second embodiment, the method includes accepting horizontal scrolling information, the horizontal scrolling information arranged to request a one or more second sequences of stories, the one or more second sequences associated with sequentially incrementing dates or sequentially decrementing dates, and horizontally presenting on the display of the mobile computing device a plurality of vertically arranged columns of stories, each of the vertically arranged columns associated with a next sequential date. In some of these cases, the sequentially incrementing dates are sequentially incrementing by month or by year and wherein each sequential vertically arranged column includes stories of a next sequential month or a next sequential year, respectively.

In still some other cases of the second embodiment, the method includes presenting the plurality of stories includes outputting multimedia content, and sometimes in these cases, the multimedia content includes audio content and video content. Sometimes, in the second embodiment, the primary focus area is a first vertical column in a central column of the display of the mobile computing device, and wherein a left secondary focus area is a second vertical column arranged on a first side of the first vertical column and wherein a right secondary focus area is a third vertical column arranged on a second side of the first vertical column, the second side opposite the first side.

In another embodiment, a time-based social network architecture includes a story database to store stories generated by users of a time-based social network, an image database to store images provided by users of the time-based social network, and a fluid timeline social network application hosted at least partially on a server computer including a processor and a computer-readable storage medium. When the fluid timeline social network application is in operation, the application is configured to receive from a user computer device a created story, the created story including at least one of textual information and image information, receive from the user computer device a user-specified date to be associated with the created story, and associate the created story with the user-specified date. The application is also configured to associate the created story with an actual time and date that the created story is received by the fluid timeline social network application, and provide the story to the story database for storage.

In some cases of this embodiment, the fluid timeline social network application is further configured to receive from the user computer device a user-selected date, and provide to the user computer device a first plurality of stories associated with the user-selected date and a second plurality of stories associated with a date sequentially later or sequentially earlier than the user-selected date, the first and second pluralities of stories arranged for horizontally and vertically scrollable presentation based on the user-selected date.

In at least one embodiment, a social network is provided that includes a story database, an image database and a fluid timeline social network application. The story database is configured to store stories generated by users of the social network. The image database is configured to store images provided by users of the social network. The fluid timeline social network application is hosted at least partially on a server computer including a processor and a computer-readable storage medium, and is configured to: receive from a user computer device a created story, the created story including at least one of textual information and image information, receive from the user computer device a user-specified date to be associated with the created story, associate the created story with the user-specified date, associate the created story with an actual time and date that the created story is received by the fluid timeline social network application, and provide the story to the story database for storage.

These features with other objects and advantages, which will become subsequently apparent, reside in the details of construction and operation as more fully described hereafter and claimed, reference being had to the accompanying drawings forming a part hereof.

Within the social networking architectures and methods discussed in the present disclosure, the social networks are organized as time-based or as having a fluid timeline.

The innovation described in the present disclosure is new and useful, and the innovation is not well-known, routine, or conventional in the social networking industry.

The innovation described herein uses known building blocks combined in new and useful ways along with other structures and limitations to create something more than has heretofore been conventionally known. The embodiments improve on computing systems which, when un-programmed or differently programmed, cannot perform or provide the specific time-based social networking features claimed herein.

The embodiments described in the present disclosure improve upon known social networking architectures, structures, processes, and techniques.

The computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately.

There is no prevailing, accepted definition for what constitutes an abstract idea. To the extent the concepts discussed in the present disclosure may be considered abstract, the claims present tangible, practical, and concrete applications of said allegedly abstract concepts.

The embodiments described herein use computerized technology to improve the technology of social networks, but other techniques and tools remain available to develop, implement, and operate social networks. Therefore, the claimed subject matter does not foreclose the whole or even substantial social networking technological area.

These features with other objects and advantages which will become subsequently apparent reside in the details of construction and operation as more fully described hereafter and claimed, reference being had to the accompanying drawings forming a part hereof.

This Brief Summary has been provided to introduce certain concepts in a simplified form that are further described in detail below in the Detailed Description. The Brief Summary presented here is not intended to identify key or essential features of the claimed subject matter, nor is it intended to limit the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 2 includes FIGS. 2A and 2B;

FIG. 3 includes FIGS. 3A to 3H;

DETAILED DESCRIPTION

Figure 1:
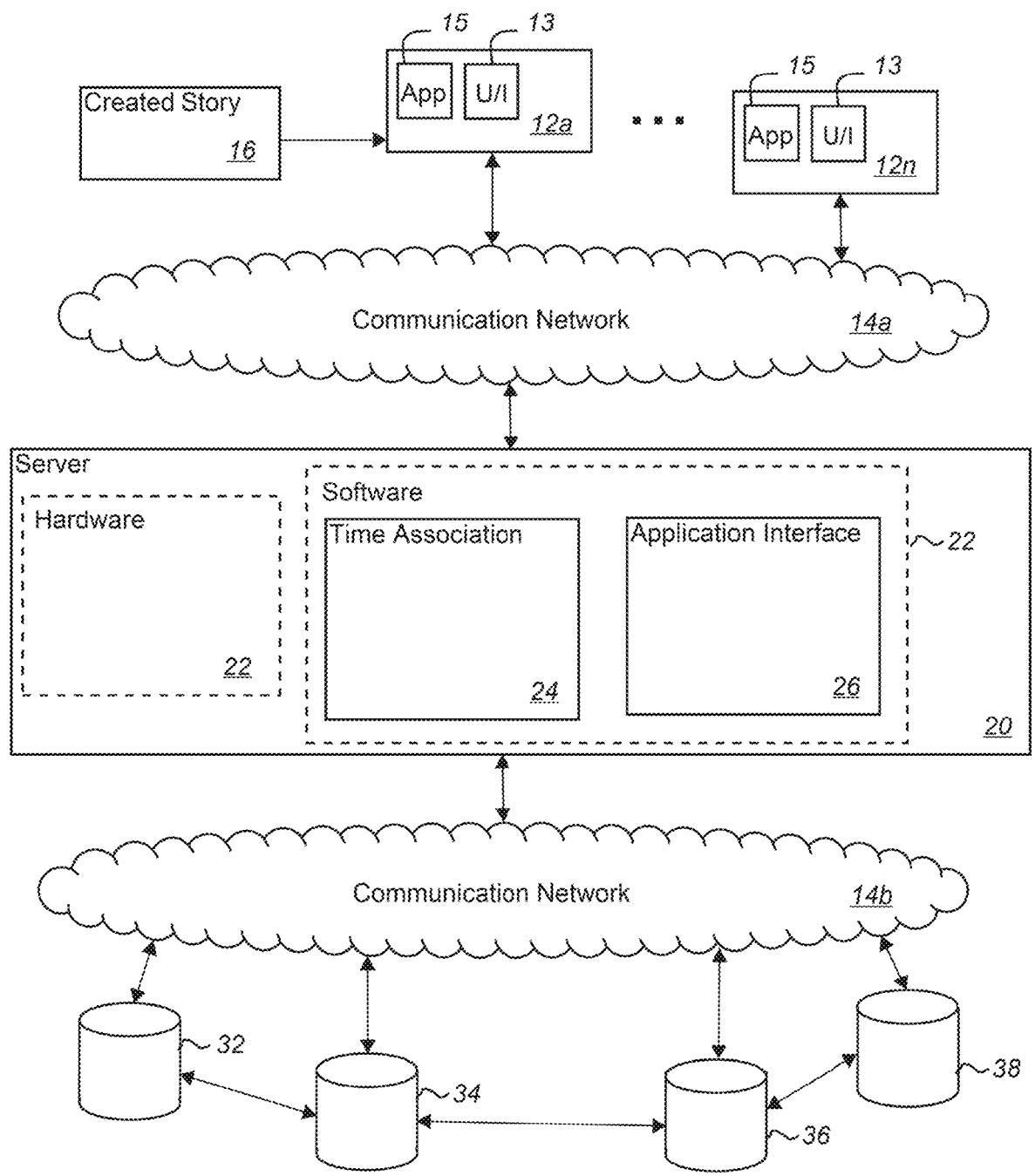
FIG. 1 is a block diagram illustrating a fluid timeline social network system, in accordance with one or more embodiments of the present disclosure.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

Prior to setting forth the embodiments however, it may be helpful to an understanding thereof to first set forth definitions of certain terms that are used hereinafter.

In the present disclosure, a "story" is a computer based object that includes one or many storage elements organized in a consistent way such the each story may be individually recognized. In one non-limiting embodiment, a story includes at least one multimedia portion, a time and date stamp associated with acceptance of the multimedia object into the time-based social network (e.g., at a determined node, circuit, module, or the like), and user-selected time information associated with a presentation of the story. The multimedia portion may optionally include any one or more of a photo, a video, an audio clip, text, a digitized block of memory that represents tactile information, a digitized block of memory that represents smell or other olfactory information, a digitized block of memory that represents electronically collected emotional, brain signal, or other physiological information, and any other like information. Stories may include, for example, an image or a video captured by a user of a smartphone or wearable device having an associated camera, and additionally or alternatively, the stories may include a text description describing an aspect of the image or video, or the story may be a purely text-based story.

In some cases, stories include additional information such as geographical information associated with the content of the story, geographical information associated with the user that is posting the story, topical information associated with the content of the story, and any other such information provided by a user or by the time-based social network and permitted by the time-based social network.

A story in many cases is arranged as a collection of data (e.g., information) stored in a transitory or non-transitory computer readable medium. The data of a story may be stored in a single location, or the data of a story may be distributed and stored in a plurality of locations. The data of a story may be stored local to a device that has generated the data or that will present the data. In some case, the data of a story is stored remotely such as in a database that is in whole or in part indexed, searchable, relational, or having other known database characteristics.

Stories, for the sake of example and not limitation, may be associated with social aspects of an individual, social aspects of a business, social aspects of another type of organization (e.g., educational institution, government entity, non-profit organization, or any other such organization), an item for rent or sale or some other commercial purpose, a job or some other employment or service offering, a resume, travel, a geographic area of location, or any other like purpose. Many other types of information have been contemplated for inclusion in the data of a story, but such information has been omitted for brevity and not for limitation.

A story may be posted by a user of the time-based social network. Posting includes electronically providing some or all data of the story to the time-based social network. Posting may also include presenting some or all of the data of a story or communicating such data to a remote device for presentation. The presentation of one or more stories may be via a software application such as a web browser executing on a computing device (e.g., a smartphone, a tablet, a laptop, a wearable computing device, a computing device implanted in an human, a desktop computing device, a kiosk, a ground-based or airborne vehicle, or any other such computing device).

A story may be viewed by a user of the time-based social network, wherein viewing a story may include a presentation of the story on a display or via an audio device such as a speaker, piezo device, or some other audio device. Viewing a story may also include delivery of the story's tactile information, olfactory information, physiological information, or other information.

A fluid timeline social network, which may also be referred to herein as a time-based social network is provided to allow users to view stories created by the user, as well as stories created by other users of the social network system.

When a user creates a story, the user may assign any time (e.g., time of day, date, or time of day and date) in the past, in the present, or in the future to be associated with that story. As such, the story will show up in the user's time-based social network feed as having occurred or as will occur an the assigned time. For example, a first user may create a story by uploading a photo taken years in the past. The first user may add descriptive text as part of the story, and the first user may further associate the created story with the date that the photo was taken. From this information, the time-based social network will present that created story in the first user's feed, as well as the feeds of other user's associated with the first user (i.e., "friends"), as of the date the photo was taken, and according to the time of day, date, or time of day and date assigned by the first user.

In some embodiments, a user feed, which may also be referred to as "a wall," can be presented in the fluid timeline social network in two modes: a browsing mode, and a reading mode. In the browsing mode, users are presented with icons or columns of stories arranged along a horizontal timeline, with each icon or column representing a particular period of time (e.g., a day, a week, a month, a year, a period of days, weeks, months, or years, etc.). Users may scroll along the horizontal timeline (e.g., left and right) and select any particular time period or icon of interest (e.g., a particular day, week, month or year). Once the particular time period is selected, the fluid timeline social network feed is switched to the reading mode. In the reading mode, particular stories that have been associated with that particular time period are displayed in a scrollable, vertically-arranged timeline, with each story being ordered vertically based on the actual time the story was created or based on some other criteria such as geographic location, topic, price (e.g., in the case of a marketplace), and the like as opposed to the time that was assigned to story by the creating user.

FIG. 1 is a block diagram illustrating a fluid timeline social network system 10, which for brevity may be referred to hereinafter as "system 10," in accordance with one or more embodiments of the present disclosure. The system 10 includes a computing server 20 that is configured with fluid timeline social network software 22 (e.g., one or more of an application, a website, an operating system, a web server, and the like), a time association module 24 and an application interface 26 arranged as part of the social network software 22, a story database 32, an image database 34, a marketplace database 36, and any number of other databases represented by additional database 38. The computing server 20 includes computing server architecture having processor cores arranged to execute instructions stored in associated memory. The instructions executed by the processor cores are directed by requests received from a plurality of remote computing devices 12a-12n.

The system 10 may further include one or more user computer devices 12a-12n, which may access the fluid timeline social network software 22 via a first communication network 14a. User computer devices 12a-12n include, for example, fixed and mobile computing devices such as smartphones, tablet computers, laptops, wearable computing devices, computing devices implanted in an human, desktop computing devices, kiosks, ground-based or airborne vehicles, or any other such computing devices. Such computing devices have at least one processor arranged to execute instructions stored in a non-transitory computer readable media associated with the at least one processor. These electronic circuits (i.e., hardware), and other circuits are expressly arranged in the user computer devices 12a-12n but not shown for brevity.

The first communication network 14a may utilize one or more protocols to communicate via one or more physical networks, including personal networks, local area networks, and wide area networks that may implement wireless networks, dedicated lines, intranets, the Internet, and the like. The user computer devices 12a-12n are often but not necessarily capable of accessing and passing data across the first communication network 14a.

In some cases, the user computer devices 12a-12n include a user interface 13 such as a display. The user interface 13 may include a touch screen capable of receiving input from a user that touches the screen. In some embodiments, the user computer devices 12a-12n may include one or more peripheral input devices, such as a keyboard, mouse, touchpad, buttons, and the like, capable of receiving input from a user of the user computer devices 12a-12n.

The fluid timeline social network software 22 may be stored, at least partially, on transitory or non-transitory computer-readable memory contained in or otherwise accessible by the computing server 20. When one or more processing cores of the computing server 20 execute the fluid timeline social network software 22, the various features and functionalities of a time-based social network are provided as described in further detail herein.

While the fluid timeline social network software 22 is shown in FIG. 1 as residing on a single computing server 20 device, it will be readily appreciated that the fluid timeline social network software 22 may be provided in a distributed computing environment such that portions of the fluid timeline social network software 22 are stored in and/or executed by a number of physically separate server computers, each having access to one or more other portions of the fluid timeline social network software 22, which may be stored in and executed by one or more other computing server devices.

Additionally, or alternatively, the user computer devices 12a-12n may further include a local fluid timeline social network application 15. The local fluid timeline social network application 15 may be, for example, a downloaded application for local execution, which may provide some or all of the features and functionality of the fluid timeline social network software 22 to a user computer device 12a-12n. At some times, the local fluid timeline social network application 15 of a particular computer device 12a-12n is communicatively coupled to fluid timeline social network software via the application interface 26. Thus, the local fluid timeline social network application 15 may provide some or all of the features of the system 10 to a user of a user computer device 12a-12n even when, for example, the user computer device 12a-12n is not communicating with the fluid timeline social network software 22 via the first communication network 14a.

A first user of the system 10 may create a story 16 using a user computer device 12a-12n. The created story 16 is an object created by the first user of the system 10 for posting and/or for sharing with other users (e.g., friends or other users connected to the first user via the system 10) of the fluid timeline social network system 10. The created story 16 may be associated with the first user's profile or account within the system 10.

Each created story 16 may be associated by the time association module 24 with two determined times. First, the time association module 24 may associate the created story 16 with a time and date that the created story 16 was actually created. Second, the time association module may associate the created story 16 with a user-specified time to be assigned to the created story 16. The user-specified time may be a user-specified time of day, a user-specified date, or a user-specified time of day and a user-specified date. In this way, users of the system 10 may specify any time, past, present, or future, to be assigned to each created story 16. As such, the created stories will appear in the users' feeds, which are time-based feeds within the fluid timeline social network system 10, as of the time specified by the user. Stated differently for ease in understanding, a user may create a story at a first particular time and date, and the user may assign a second particular time to that story that is months or even years in the past or in the future. In such a case, the story will appear in the user's feed as well as the feeds of other users having access to the particular user's stories as of that assigned date that can even be months or years in the past or future.

In this example, the time association module 24 timestamps the created story 16 with the actual time and date that the story was created (e.g., received by the time association module 24). As such, the stories created in the system 10 may be catalogued and may be presented based on when the stories were actually created as well as at the time that the creating user assigns to the story.

The user interface 13 of the computer device 12a-12n is arranged to cooperate with the fluid timeline social network software 22 via the local fluid timeline social network application 15. The cooperation may include creating and posting a story. The user interface 13 may be provided, for example, as a display of a smartphone. The user interface 13 may permit a user to enter text in a description field that is accessed by the user to enter a textual description of the story that the user is creating. The user may create a text-only story, or the user may enter text describing an image or another multimedia object to be included within the story. The user interface 13 may include a variety of features for use in creating a story, including, for example, a location tool, a file or image uploading tool, a camera tool, an emoticon tool, a time entry tool, and many other tools.

The location tool of a computer device 12a-12n may be fully or partially arranged with the local fluid timeline social network application 15 and utilized to append geospatial location data (e.g., address, city, state, latitude/longitude, or the like) to a created story. The location tool may, for example, access a global positioning system (GPS) device or a mapping module within or otherwise accessible to the local fluid timeline social network application 15 or the fluid timeline social network software 22.

A file or image uploading tool may also be fully or partially arranged with the local fluid timeline social network application 15. The file or image uploading tool allows a user of the computer device 12a-12n to insert a file or image already stored on the user computer device 12a-12n into the story being created. For example, a user may use the file or image uploading tool to access an image library stored on the user computer device 12a-12n. A selected file or image may then be added to the story and inserted into an image field.

A camera tool may also be fully or partially arranged with the local fluid timeline social network application 15. A user may access a camera included or associated with the user computer device 12a-12n via the local fluid timeline social network application 15, and the user may thus take a picture or video, which may then be inserted into the image field.

In some embodiments, an emoticon tool may also be fully or partially arranged with the local fluid timeline social network application 15. The emoticon tool may be utilized to insert one or more emoticons into a description field of the created story. Further, a text input tool (e.g., a virtual keyboard displayed on the computer device 12a-12n) may be provided via the user interface 13, which allows the user to provide textual input into a description field.

A time tool may also be fully or partially arranged with the local fluid timeline social network application 15. The time tool allows a user to provide a user-specified time to be associated with the created story. The user-specified time may be a user-specified time of day, a user-specified date, or a user-specified time of day. For example, using the time tool, a user may specify any past, present, or future date to be associated with the created story. Then, once the created story has been posted, the story will be inserted into the user's story feed, as well as any other users' feeds having access to or otherwise including the particular user's stories, as having occurred on the past, present, or future time associated with the story.

After the story has been created, the user may post the story utilizing a post story tool, which in some cases is implemented via user click on a single icon presented via that user interface 13. Once the created story has been posted, that story may be made available to the user, to the user's time-based social network friends, or even to all users of the system 10 depending on user preferences for the particular created story. In some cases, the user interface 13 allows the user to specify a level of privacy to be associated with each created story (e.g., "public," "friends," "only me," and so on).

Referring still to FIG. 1, the created story 16 is provided to the fluid timeline social network software 22 via the first communication network 14a. The fluid timeline social network software 22 accesses the time association module 24 to "timestamp" the created story with the actual time and date that the story was created and posted. As an example, the time association module 24 may timestamp the created story 16 utilizing a UNIX timestamp retrieved by a determined node of the computing server architecture. The time association module 24 may further be utilized during creation of the story 16, to assign a particular date and/or time to that story, as described above with respect to the time tool of the computer device 12a-12n. In this way, when a user specifies a time, date, or time and date for the created story 16, the time tool may access the time association module 24, which associates the created story 16 with the specified time.

The time association module 24 provides, for every created story 16 of system 10, an association with two separate timelines. First, the time association module 24 associates a created story 16 with the actual date and time that the story was created and posted (e.g., the UNIX timestamp). Second, the time association module 24 associates the user-provided time data that specifies when the created story 16 occurred or will occur (i.e., where the story will be displayed with respect to a timeline representation of the user feed).

Created stories 16 are provided by the fluid timeline social network application 15 and passed by the fluid timeline social network software 22 to the story database 32, the image database 34, the marketplace database 36, or the additional database 38. The created stories 16 are passed via the second communication network 14b. The second communication network 14b may utilize one or more protocols to communicate via one or more networks along the lines of the first communication network 14a. In some cases, the first communication network 14a and the second communication network 14b are the same communication network.

Created stories 16 may be stored, in whole or in part, in story database 32. Story database 32 may be any database, and may be, for example, a DYNAMODB hosted, provided or maintained by AMAZON WEB SERVICES (AWS). Further, the story database 32 may be a distributed database, residing on more than one physical storage medium accessible by the fluid timeline social network software 22. The created stories 16 may include the user-specified and user-directed time associations (e.g., time of creation, and user-assigned time for the story), which may be provided by the time association module 24 when the stories are created.

Every story stored in story database 32 may be stored in a main table in story database 32 with associated time-based accessors (e.g., pointers, references, etc.) which order the stories in two directions (e.g., forward in time and backward in time). These accessors allow the stories to be displayed, and scrolled through, along a horizontal timeline and along a vertical timeline.

Image database 34 may store images or other multimedia that are included as part of the created stories 16, which are created by users of the system 10. That is, image database 34 may store actual image files uploaded by users of system 10 as part of created stories 16. In such a case, story database 32 may store text descriptions of the story, as well as any other details associated with the story (e.g., user comments, likes/dislikes, location information, emoticons, etc.). The image database 34 may further store one or more links to a location of the image database 34 to retrieving the image or other multimedia associated with the particular story. Thus, when a user accesses a story feed via a user computer device 12a-12n, the local fluid timeline social network application 15 and the fluid timeline social network software 22 may retrieve the story stored in the story database 32. The image or other multimedia associated with that story, for example based on a link contained within the story in the story database 32, may be retrieved directly from the image database 34 for inclusion in the story when it is presented on the user computer device 12a-12n.

Image database 34 may be, for example, a database provided by a content delivery network, such as AMAZON S3 (AMAZON SIMPLE STORAGE SERVICE). Moreover, image database 34 may be a distributed database, residing on more than one physical storage medium accessible by the fluid timeline social network software 22.

Figure 2A:
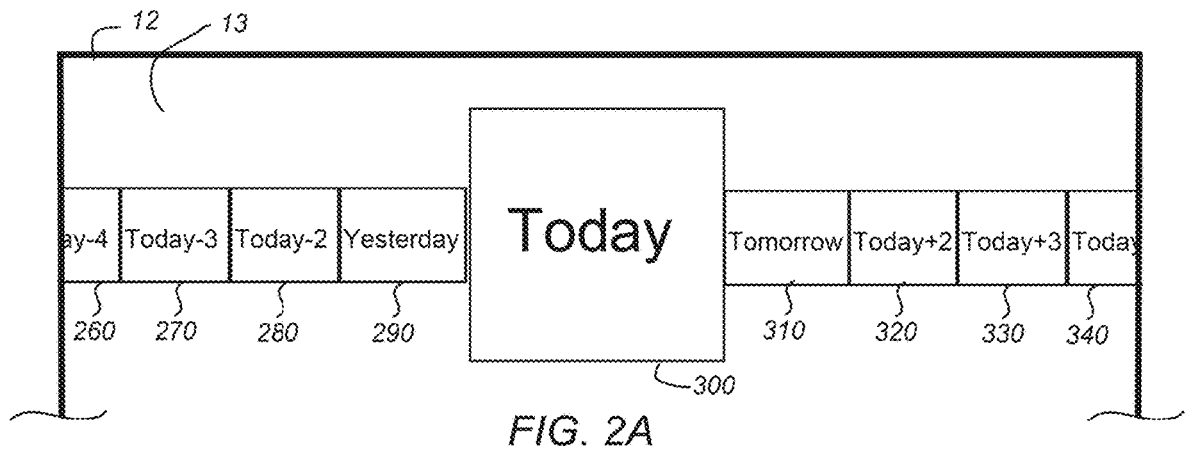
FIG. 2A illustrates a graphical user interface view of a browsing mode for interacting with a user's fluid timeline social network feed, in accordance with one or more embodiments of the present disclosure.
Figure 2B:
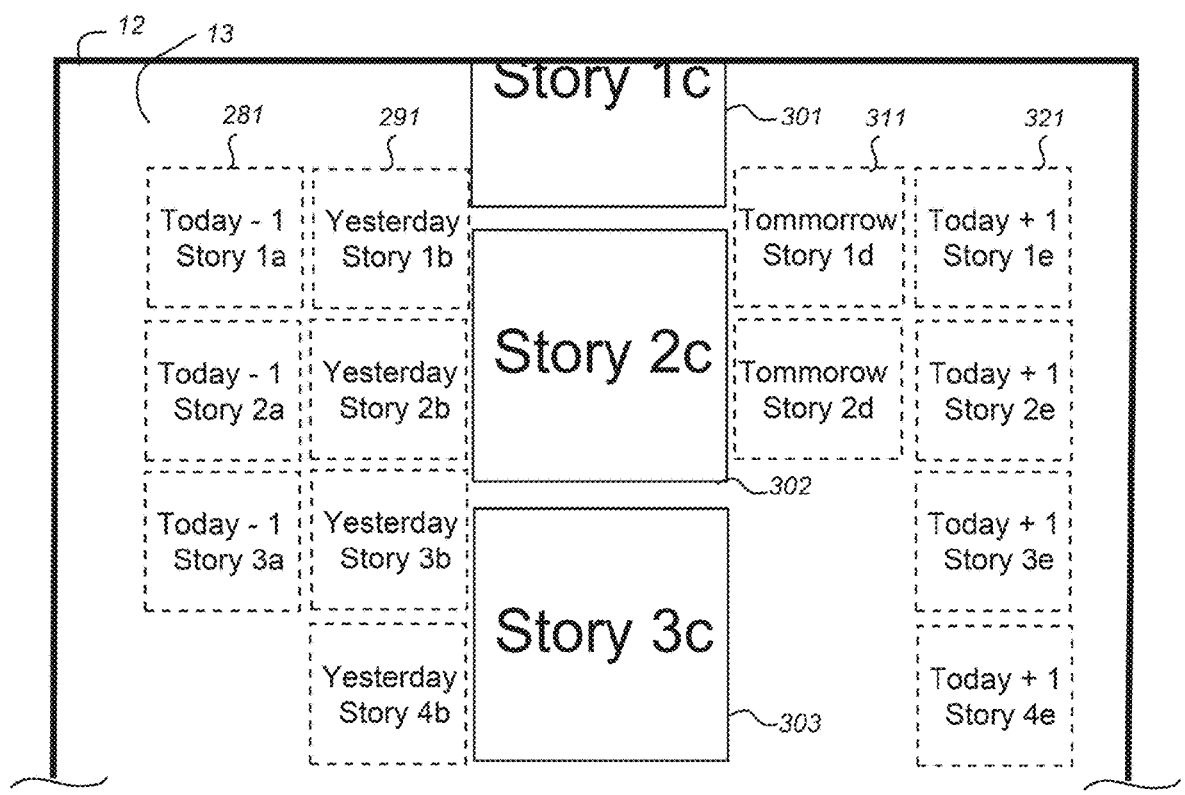
FIG. 2B illustrates a graphical user interface view of a reading mode for interacting with a user's fluid timeline social network feed, in accordance with one or more embodiments of the present disclosure.
Figure 3A:
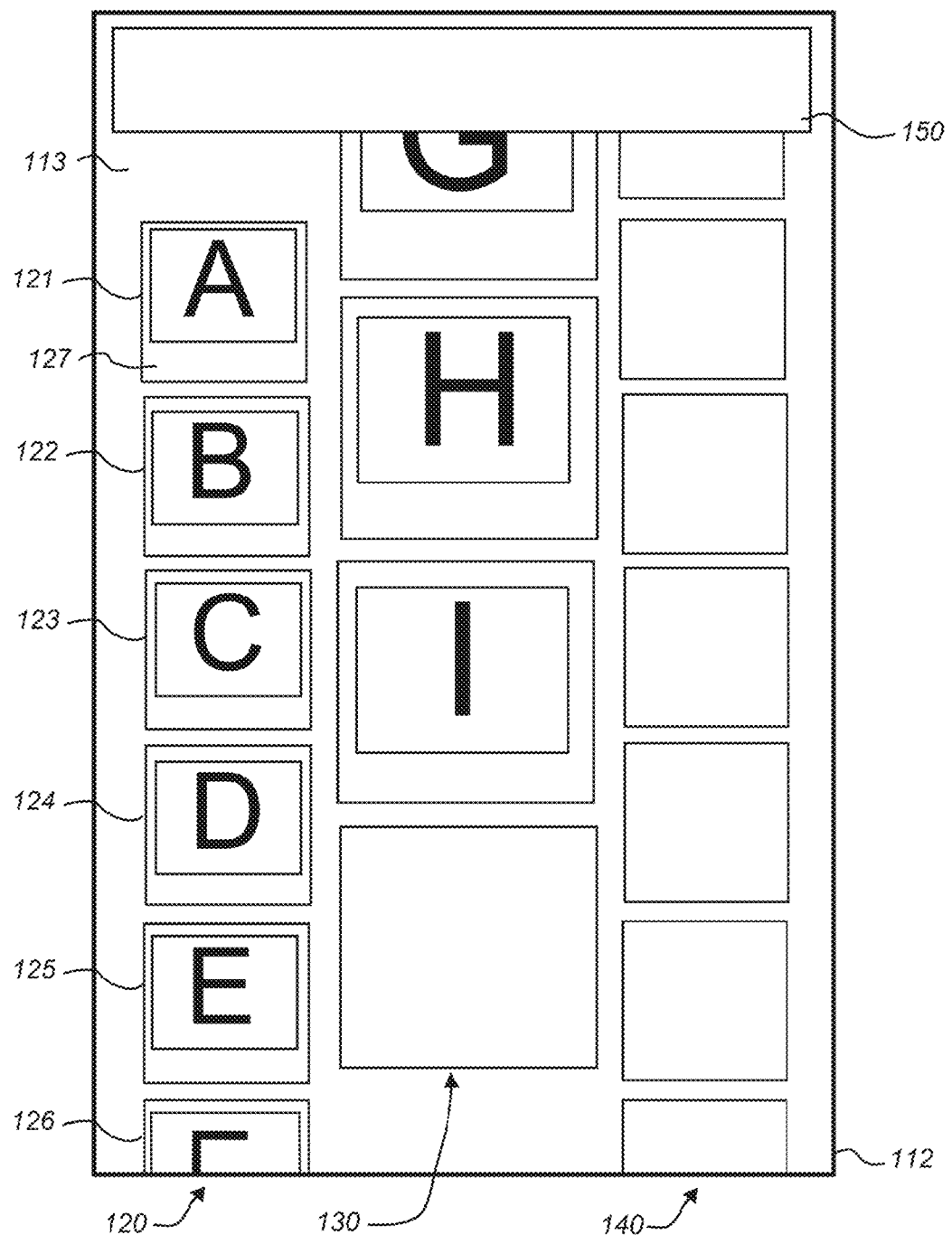
FIGS. 3A-3H are a plurality of exemplary user interface "screen shots" of a user's computer device according to embodiments described in the present disclosure.
Figure 3B:
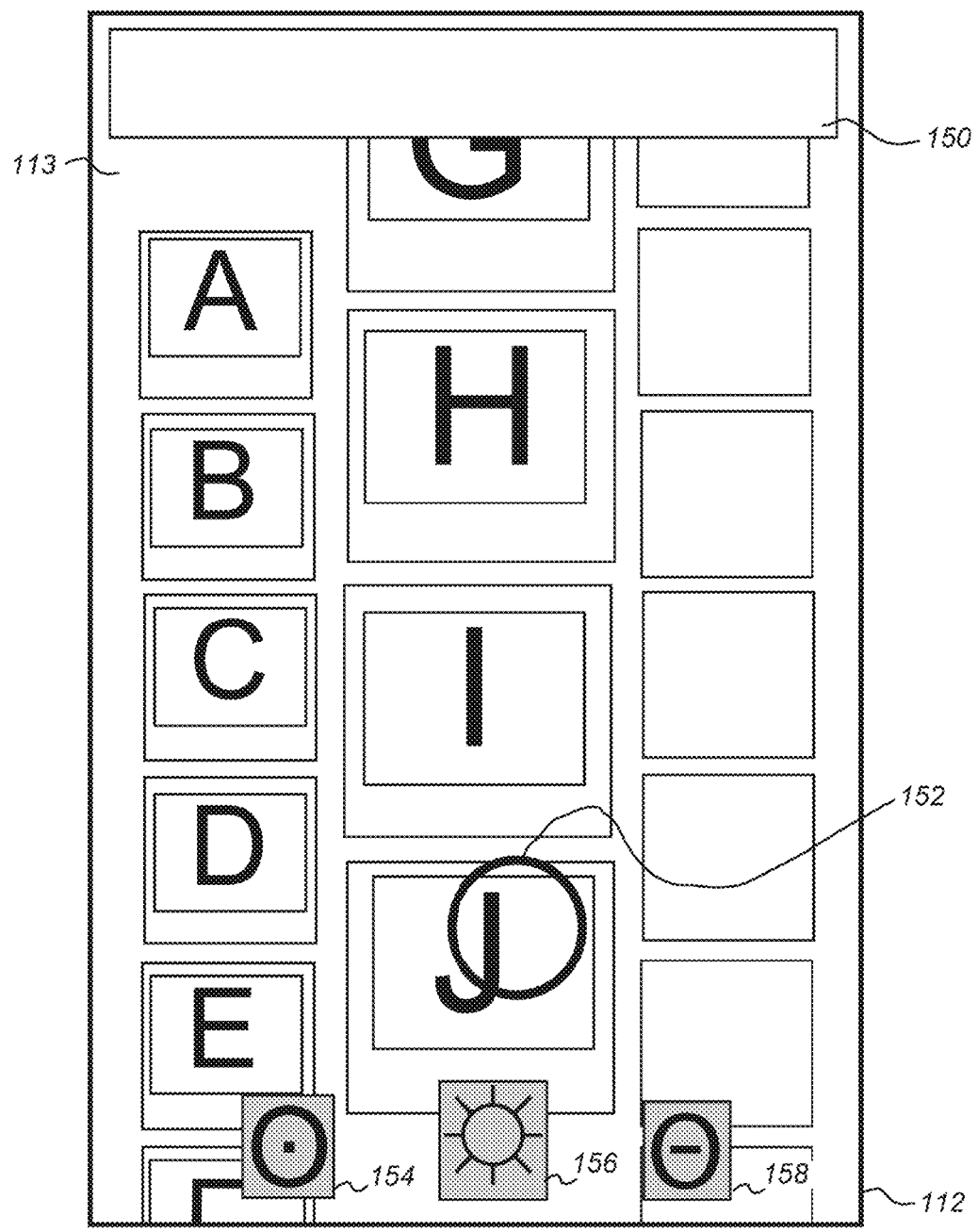

FIG. 2 includes a portion of a computer device 12, which is along the lines of computer devices 12a-n. In FIG. 2, the user interface 13 includes a display on which is presented content of a fluid timeline social network. FIGS. 2A and 2B illustrate different graphical user interface views of a user's fluid timeline social network feed. The fluid timeline social network feed is provided by cooperation of the local fluid timeline social network application 15 and the fluid timeline social network software 22. FIG. 3A illustrates a "browsing" mode, and FIG. 3B illustrates a "reading" mode.

As shown in FIG. 2A, in the browsing mode, a user may view, via the user interface 13 display of a user computer device 12a, their story feed along a horizontally-arranged timeline. The feed is shown in FIG. 2A as a daily feed; however, it will be readily appreciated that the feed may be displayed, for example, in weekly, monthly, yearly or other such increments of time (i.e., a selected time period). In the browsing mode, the user may scroll horizontally in either the left or right direction. The scrolling may be implemented, for example, by utilizing a finger swipe on a touchscreen of a smartphone, a mouse, arrows, or any other such input mechanism. In this way, a desired time period may be highlighted or otherwise brought to the center of the displayed feed.

As shown in FIG. 2A, an icon representing stories associated with today 300 may be highlighted. In such a case, the icons representing the stories associated with tomorrow 310, two days from today 320, three days from today 330, and four days from today 340 may be sequentially displayed in order to the right of the icon for today 300. Similarly, icons representing the stories associated with yesterday 290, two days ago 280, three days ago 270, and four days ago 260 may be displayed sequentially to the left of the icon for today 300.

In the representation of FIG. 2A, the time period represents a single day, but in other embodiments, different time periods (e.g., by hour, by week, by month, by year, by decade, by century, by millennia, and the like) may be selected by a user. Also in the representation of FIG. 2A, various icons are illustrated to represent each time period, which representation facilitates understanding of the horizontally scrollable presentation based on the user-selected time period. In some embodiments, rather than an "icon," a vertical column of stories associated with each time period may be presented. In cases such as this, the horizontal scrolling includes horizontally scrolling a plurality of columns of user stories wherein each column is associated with a different time period.

In FIG. 2A, each created story 16 is thus associated with a browsing mode time period, such as a date. The time period is specified by the user when the user generates the created story 16, though in some embodiments, the time period for any particular story may be edited. Accordingly, the created story 16 will be provided in the user's feed and in certain other users' feeds in the browsing mode as of the time-period specified by the creating user.

In an exemplary embodiment provided to help clarify the subject matter, a user creates a story at 8:00 am Pacific Standard Time on May 10, 2016. The user specifies a date of Jan. 17, 2013 using, for example, a time tool of the local fluid timeline social network application 15. The specified data of Jan. 17, 2013 is associated with that story. After the created story is posted, the created story will appear in the user's feed, as well as in the feeds of other users within the user's network (e.g., friends), as having occurred on Jan. 17, 2013.

In addition to the user-specified time period, each created story 16 is associated with a time and date of creation. The time and date of creation may be an actual time and date the story was created, a time stamp associated with when the story is received by a determined node or circuit of the fluid timeline social network software 22, or some other time and date.

FIG. 2B illustrates a graphical user interface view of a reading mode for interacting with a user's fluid timeline social network feed, in accordance with one or more embodiments of the present disclosure. As shown in FIG. 2B, in the reading mode, a user may view, via a display of user interface 13 of a user computer device 12a, a story feed along a vertically-arranged timeline. The user may switch from the browsing mode to the reading mode, for example, by first scrolling horizontally through the browsing mode and by then identifying a particular day, week, month, year, or other time period of interest. When the desired time period is identified, the user may enter the reading mode simply by scrolling vertically.

For example, as shown in FIG. 2A, the user has a desire to access the stories in a feed of "Today" 300. The user may then select the time of interest (e.g., Today 300), for example, stopping the horizontal scrolling when Today 300 is in a primary focus area, which is a first vertical column in a central column of the user interface 13 display of the computer device 12a. The user may stop the horizontal scrolling by tapping a touchscreen, clicking a mouse, or the like. Once selected, the user may then view then feed using the reading mode, as shown in FIG. 2B.

In FIG. 2B, a primary focus area shows a first vertical column in a central column of the user interface 13 display of the computer device 12a. A left secondary focus area is a second vertical column arranged on a first side (e.g., a left side) of the first vertical column, and a right secondary focus area is a third vertical column arranged on a second side (e.g., a right side) of the first vertical column. The second side is opposite the first side.

In the reading mode, all of the stories in the user's feed (i.e., all stories associated with the user, including, for example, stories created by the user, stories created by the user's friends, stories created by users that the user is following, etc.) that were associated with that particular period of time (e.g., Today 300) are provided in a vertically scrollable feed.

In some cases, the stories are arranged in the reading mode in chronological order, based on the actual time and date that the stories were created (e.g., as may be determined from the timestamp information appended to each created story). Thus, in the example of FIG. 2B, the first story 301 to be displayed in the user's reading mode feed may be the most recently created story having a user-specified date matching the date of the reading mode view (e.g., Today 300). The second story 302 is the second most recently created story, and the third story 303 is the third most recently created story. By scrolling vertically scrolling downward, the user may be provided with additional stories associated with the relevant reading mode date (e.g., Today 300). As the user scrolls downward, each story is displayed in chronological order based on the date and time the story was actually created. Thus, the further downward the user scrolls, the older (i.e., created further in the past) each displayed story is.

Stories may be sequenced in any desirable order. For example, in one case, stories are sequenced based on the time-date stamp and stories that are more recent in time are fed before stories that are more distant in time. In another case, stories are sequenced based on a current reported location of the computer device 12a and stories that are closer in proximity to the current reported location are fed before stories that are further away from the current reported location. In still other cases, stories are sequenced based on a particular type of goods or services, based on a topic of the subject matter of the feed, based on a dollar value, or based on some other reason.

Any particular story within the reading mode feed may be selected (e.g., by a finger tap, click of a mouse, or the like), and further details of that story may then be displayed. For example, user comments related to the story, user "likes" or "dislikes," links to other associated stories, or the like, may further be displayed when a user selects a particular story from among the stories displayed in the reading mode.

Also shown in FIG. 2B are a plurality of other columns of story feeds. The feeds to the left of the Today 300 feed (i.e., The Today 300 feed includes Story 1c, Story 2c, Story 3c.) are earlier in time and sequenced by the user selected time period. The feed immediately to the left of the Today 300 feed is the Yesterday 290 feed. In the Yesterday 290 feed, only a single story 291 is called out to avoid unnecessarily cluttering the figure. To the left of the Yesterday 290 feed is the Today minus one day (Today−1) feed 280, which calls out only a single story 281 for simplicity. The feeds to the right of the Today 300 feed are later in time and sequenced by the user selected time period. The feeds to the right of the Today 300 feed include the Tomorrow feed 310 and the Today plus one day (Today+1) feed 320, which also identify only a single story 311, 321 for simplicity.

FIG. 3 includes FIGS. 3A to 3H. In FIGS. 3A-3H, a plurality of exemplary user interface 113 "screen shots" of a user's computer device 112 are illustrated according to embodiments described in the present disclosure. The user's computer device 112 is along the lines of computer device 12 (FIG. 2) and computer devices 12a-n (FIG. 1), and further discussion is not provided for brevity. The user interface 113 is along the lines of user interface 13 (FIGS.

1 and 2), and further discussion is not provided for brevity. Like reference numbers and structures in FIGS. 3A-3H are shown and not expressly called out in each figure to avoid unnecessarily cluttering the figure and thereby obscuring particular features of interest.

In FIG. 3A, a first user's computer device 112 is communicatively coupled to fluid timeline social network software 22 that is arranged organize a time-based social network in a computing server architecture. The first user's computer device 112 is executing a local fluid timeline social network application 22. The user interface 113 is arranged to display a plurality of stories that are received at the computer device 112 and arranged for horizontally and vertically scrollable presentation based on a user-selected time period. The user-selected time period may be an hour, a day, a month, a year, or some other time period. In FIG. 3A, the time period is a day.

A first column of stories 130 represents Today, a second column of stories 120 represents Yesterday, and a third column of stories 140 represents Tomorrow. The plurality of stories have been generated by users of the time-based social network, and each story has been associated with a user-specified time when the story was first posted. In some cases, the user-specified time may be edited by the original user, by a different user that has been authorized, or by the fluid timeline social network software 22. The user-specified time may be a user-specified time of day, a user-specified date, or a user-specified time and date.

Each story that has been received by the fluid timeline social network software 22 has been assigned a different system-wide unique number. The system-wide unique number permits massive storage of stories based on the assigned system-wide unique number and indexing in one or more databases for fast storage and retrieval. In this way, storage and retrieval of stories can be in real time or near real time, which is perceived by a user to be very fast and nearly if not completely instantaneous. Each story may, for example, may be associated with a particular user, a group of users, a time-date stamp, a user-specified time, a geographic location, a user-specified topic, an automatically generated system-determined topic, and many other things.

When a user operates a local fluid timeline social network application 15 executing on computer device 112, the device is fed a plurality of stories by the fluid timeline social network software 22. The plurality of stories is arranged for presentation on the user interface 113 based on a user-specified time period, and the fluid timeline social network software 22 accepts input directions from computer device 112 based on the user's interaction with the local fluid timeline social network application 15. The user's the input directions are arranged to request one or more sequenced stories, and each of the sequenced stories is associated with the same selected time period.

In FIG. 3A, a columnized plurality of stories is presented for each of Yesterday, Today, and Tomorrow. The plurality of stories are sequenced in a particular order. The particular order has a default order, and the particular order may be changed manually by the user or automatically by the local fluid timeline social network application or fluid timeline social network software 22.

In FIG. 3A, stories in the Yesterday column 120 include stories 121-126. Other stories on other columns are not expressly identified for ease in understanding the drawing, though the principles of the columns are along the lines of the Yesterday column 120.

Each story may further have a story information area 127. The story information area may present ownership information (e.g., a user identifier, an icon, a thumbnail photograph, etc.), and in addition or in the alternative, the story information area may present status information regarding interaction by other users (e.g., "likes," "votes," number of comments, time of last comment, requests to connect, requests to pursue a transaction, etc.). The story information area 127 is illustrated at the displayed bottom of a story, but in other embodiments, the displayed information area 127 may be in any other one or more areas associated with a particular story.

The particular order sequence of each columnized plurality of stories may, for example, be based on a context of what is being viewed by the user. In some cases, the stories are sequenced based on the time-date stamp and stories that are more recent in time are fed before stories that are more distant in time. In some cases, the stories are sequenced based on a current reported location of the first user remote computing device and stories that are closer in proximity to the current reported location are fed before stories that are further away from the current reported location. In some cases, the stories are sequenced based on the how the social network is being used. For example, the social network may be being used to report social information and stories are sequenced based on time or a date. The social network may be being used in a commercial context (e.g., to sell goods or services) and in this case, stories may be sequenced based on geographic location, price, category of goods or services, category of customer, or any other category. If the social network is being used for connecting job seekers to available jobs, the stories may be sequenced based type of job, job function, location, salary, qualifications, or any other employment related category. If the social network is being used to report on food, travel, entertainment, sports, government agency or service, academic institution or course of study, or some other broad genre, stories may be sequenced in any desirable order.

In the embodiment of FIG. 3A, when a user scrolls left or right, entire columns of stories are arranged to scroll left or right. In this way, a user can scroll through time periods very quickly. In addition, via the user interface, the user can enter a specific time period and thereby "time travel" to a column of stories associated with that time period, where the new column of stories is also surrounded by columns of other stories in close proximity to the new time period.

In the embodiment of FIG. 3A, a central column of the user interface 113 is a primary focus area of a display of computer device 112. The central column is illustrated as larger than surrounding or other columns in FIG. 3A, but in other embodiments, the primary focus area is not larger than surrounding secondary focus areas, and the primary focus area is instead emphasized in another way or even not emphasized at all. That is, the primary focus area in some cases is identified in a central portion of the user interface 113, and the interaction by a user makes it evident to the user where the primary focus area is located.

In FIG. 3A, the plurality of stories are presented in columns based on the user-selected date such that stories associated with the user-selected date are vertically presented in a primary focus area of a display of the mobile computing device and stories not associated with the user-selected date are vertically presented in one or more secondary focus areas of the display of the mobile computing device. When the user scrolls the primary focus area vertically, the local fluid timeline social network application 15 will accept the vertical scrolling information and pass to the fluid timeline social network software 22 one or more corresponding requests for a sequence of stories; each story of the sequence associated with the same selected time period. The fluid timeline social network software 22 will retrieve sequenced stories from a database and communicate the sequenced stories to the computer device 112, where they will be vertically presented in the primary focus area. Stated differently, the user may scroll the central column up, down, or up and down to display a sequence of stories.

In the embodiment of FIG. 3A, stories are presented based on a time period of one day. For example, the central column in the primary focus area represents stories associated with Today 130. A first secondary focus area to the left of the central column represents stories associated with Yesterday 120, and a second secondary focus area to the right of the central column represents stories associated with Tomorrow 140. In other cases, each sequential time period (i.e., each sequential column of stories) represents a column of stories of a next sequential week, a next sequential month, a next sequential year, a next sequential decade, a next sequential century, a next sequential millennium, or the like.

The user interface 113 includes a context information area 150. The context information area may be used to deliver information, to accept user input, or to both deliver information and accept user input associated with the local fluid timeline social network application 15, the fluid timeline social network software 22, or both the local fluid timeline social network application 15 and the fluid timeline social network software 22.

In one embodiment, the context information area 150 indicates the context of the user's access to the social network architecture. The context information area 150 may, for example, indicate that the user is in a marketplace mode, a social network mode, a restaurant mode, a travel mode, a particular hobby mode, a sports mode, or any other such mode. In one of these or in another embodiment, the context information area 150 includes an area where a user can change the user-selected time period. The context information area 150 may be used for any one or more other purposes of the time-based social network.

In the embodiment of FIG. 3B, the user interface is illustrated with a selection ring 152, a first input icon 154, a second input icon 156, and a third input icon 158. The graphics of the first, second, and third input icons 152-156 may represent underlying actions that will be taken if a user selects the particular icon.

In one embodiment, for example, a first icon 154 represents a notifications feature. If the user selects the first icon, the user interface 113 partially or wholly transitions into an interface where the user can view, respond to, or otherwise take action based on certain notifications.

In an exemplary embodiment, the second icon 156 represents a profile feature. When the profile feature is selected, the user interface 113 partially or wholly transitions into an interface where the user can review, edit, enter, delete, or otherwise manipulate profile information. A user can connect to network "friends," disconnect friends, and take other social networking actions.

In yet another exemplary embodiment, the third icon 158 represents a conversations feature. When the conversations feature is selected, the user interface 113 partially or wholly transitions into an interface where the user can communicatively converse with one other user, with a group of users, or with all users of the social network. For example, the conversations feature may operate as a one-to-many chat feature, a one-to-group chat feature, or a broadcast chat feature.

In some cases, a user may be horizontally scrolling various time periods and the user may be vertically scrolling a sequence of stories of a selected time period. If the user wants to comment on a particular story, the user can select the third icon 158 and enter a conversational user interface. The user can comment by entering text, entering audio, entering visual data such as video or a still image, or entering some other information. The user can "chat" one-to-one with another user in real time, or the user can chat with a group of users in real time as in a "chat room." In still other cases, the user may simply post a comment or other multimedia input that is accessible to other users of the social network.

Figure 3C:
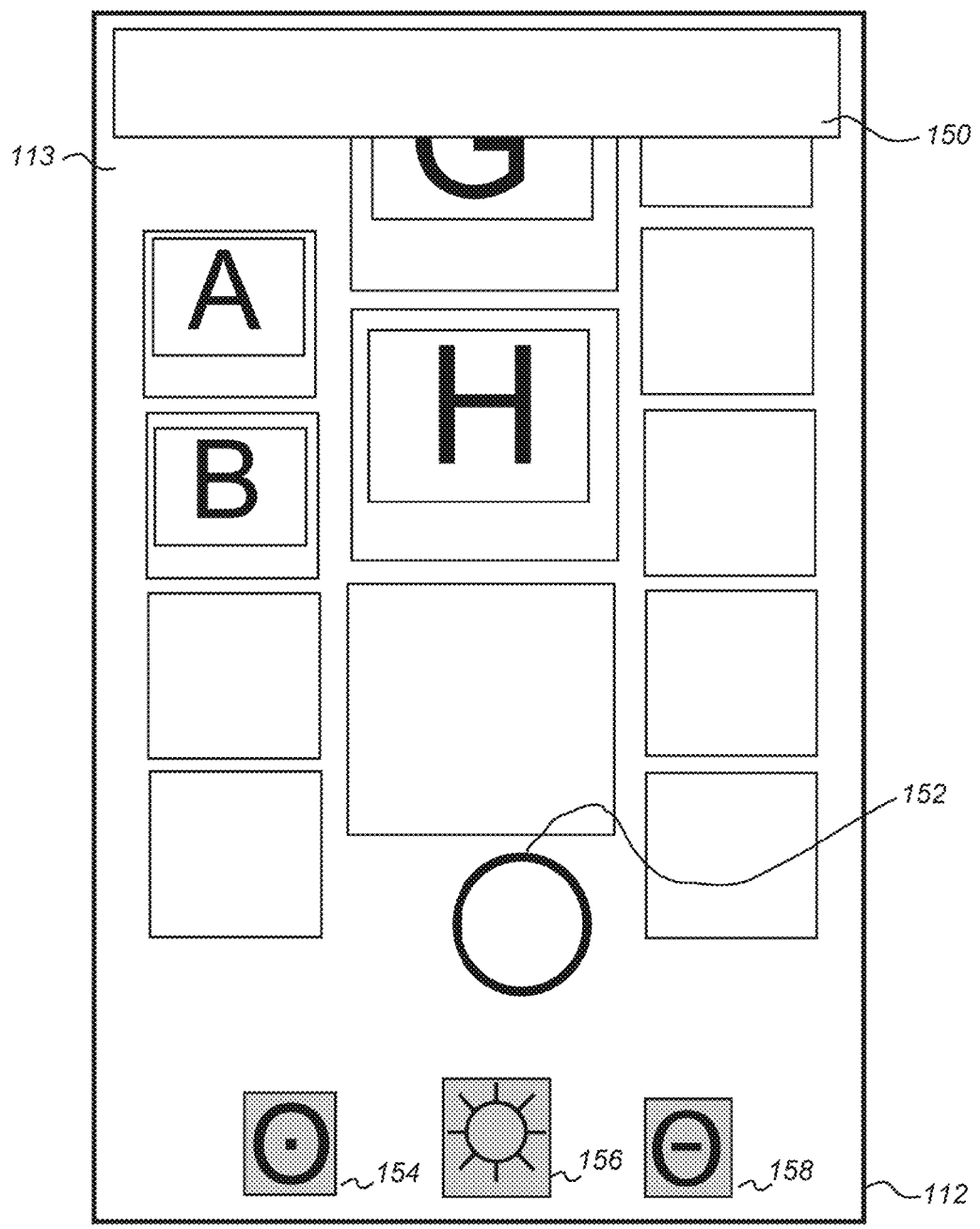

For simplification of the drawings and ease in understanding, FIG. 3C illustrates the selection ring 152, the first icon 154, the second icon 156, and the third icon 158 with some of the underlying stories removed.

Figure 3D:
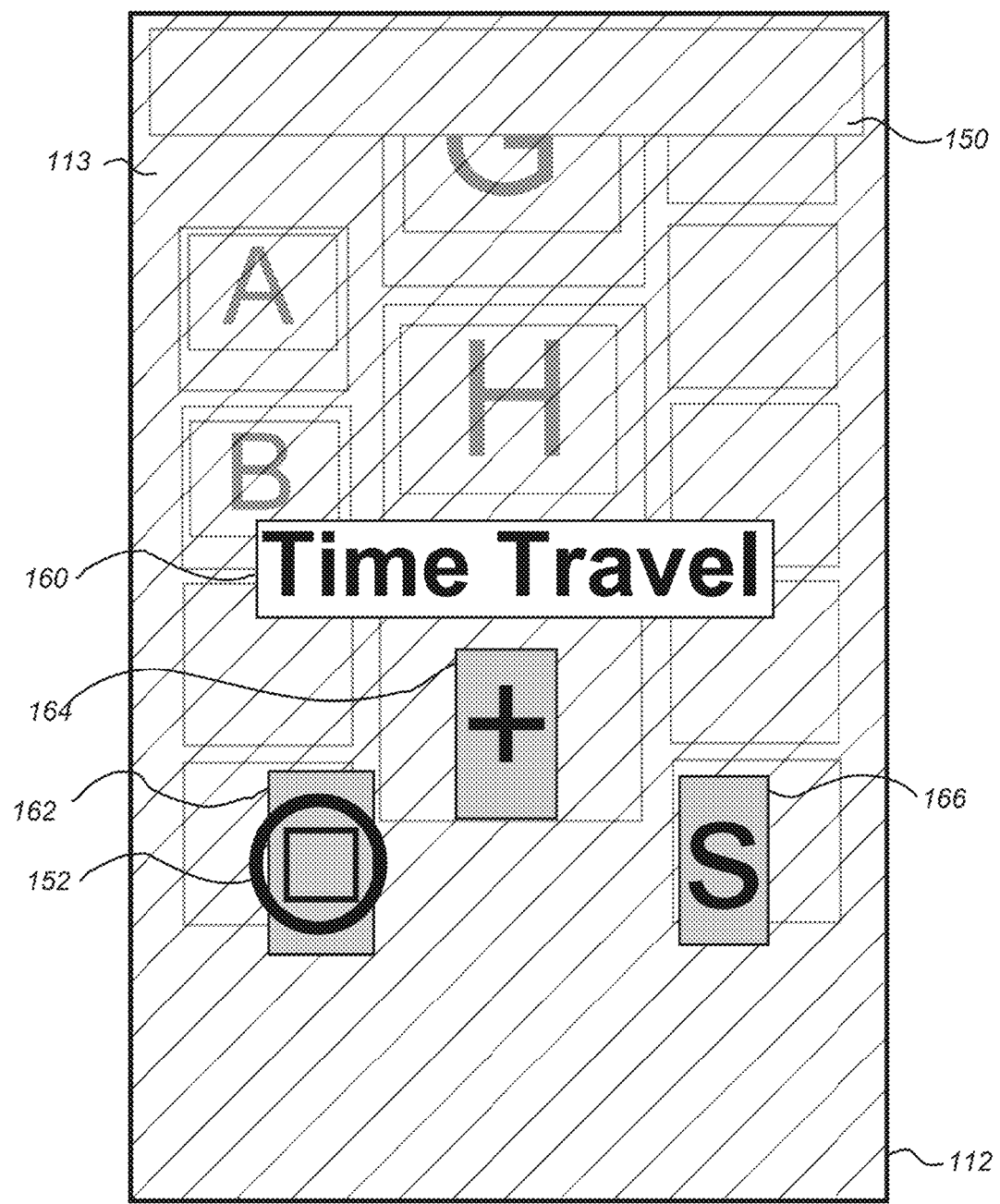

In FIG. 3D, a user has selected the selection ring 152. The selection may be via a touch screen portion of the user interface 113, a mouse pointer and associated selection action, a voice command, or some other selection action. When the selection ring 152 is selected, a selection ring siren 160 is presented. The selection ring siren 160 may present contextual information associated with manipulation of the selection ring 152. The selection ring siren 160 may include visual information as in FIG. 3D. The selection ring siren 160 may also or alternatively include audio information, tactile information, or any other information arranged to capture the attention of the user.

Manipulation of the selection ring in FIG. 3D has also caused presentation of a fourth icon 162, a fifth icon 164, and a sixth icon 166. The fourth, fifth and sixth icons 162-166 may be presented as any one or more of graphics, sounds, tactile indicators, or in some other manner. The fourth, fifth and sixth icons 162-166 may be arranged to convey particular information about one or more features associated with the particular icon. In the embodiment of FIG. 3D, the fourth icon 162 is associated with a time travel feature, the fifth icon 164 is associated with a post-story feature, and the sixth icon is associated with a search feature.

In FIG. 3D, the selection ring 152 has been manipulated and positioned above the fourth icon 162. The selection ring siren 160 indicates that selection of the fourth icon 162 will permit the user to enter a time travel feature interface.

Figure 3E:
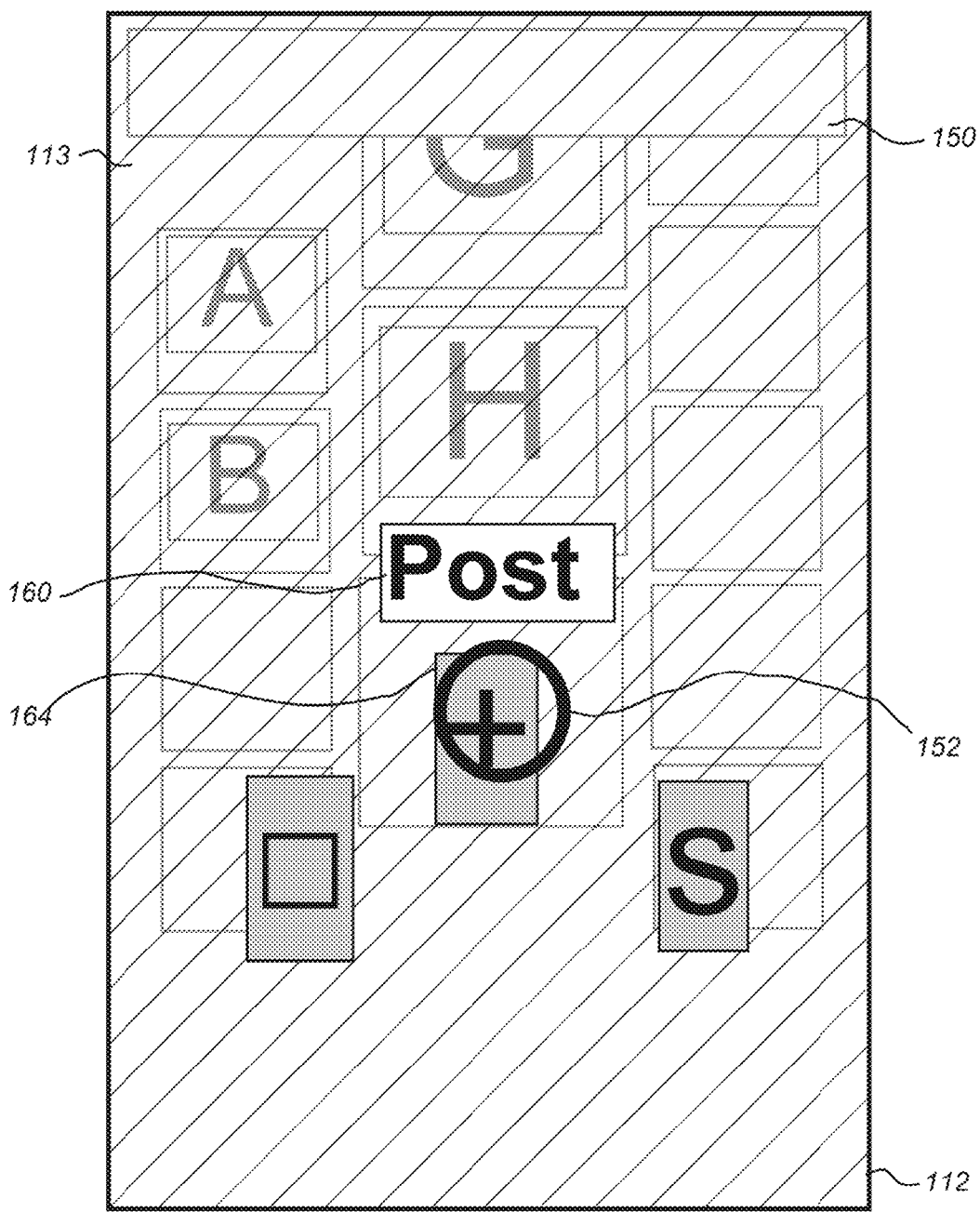

In FIG. 3E, the selection ring 152 has been manipulated and positioned above the fifth icon 164. The selection ring siren 160 indicates that selection of the fifth icon 164 will permit the user to post a new story to the time-based social network.

Figure 3F:
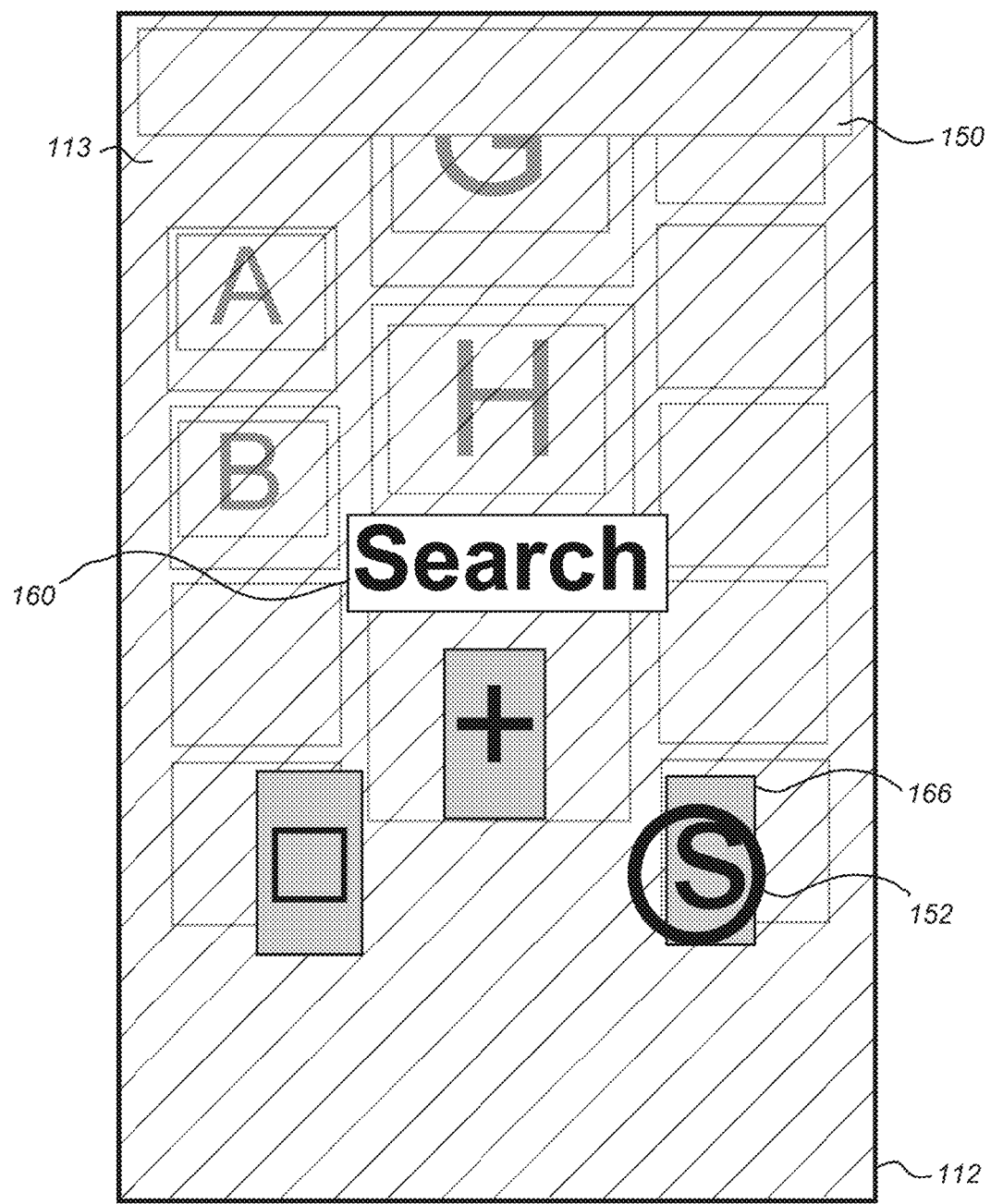

In FIG. 3F, the selection ring 152 has been manipulated and positioned above the sixth icon 162. The selection ring siren 160 indicates that selection of the sixth icon 162 will permit the user to enter a search feature interface.

Figure 3G:
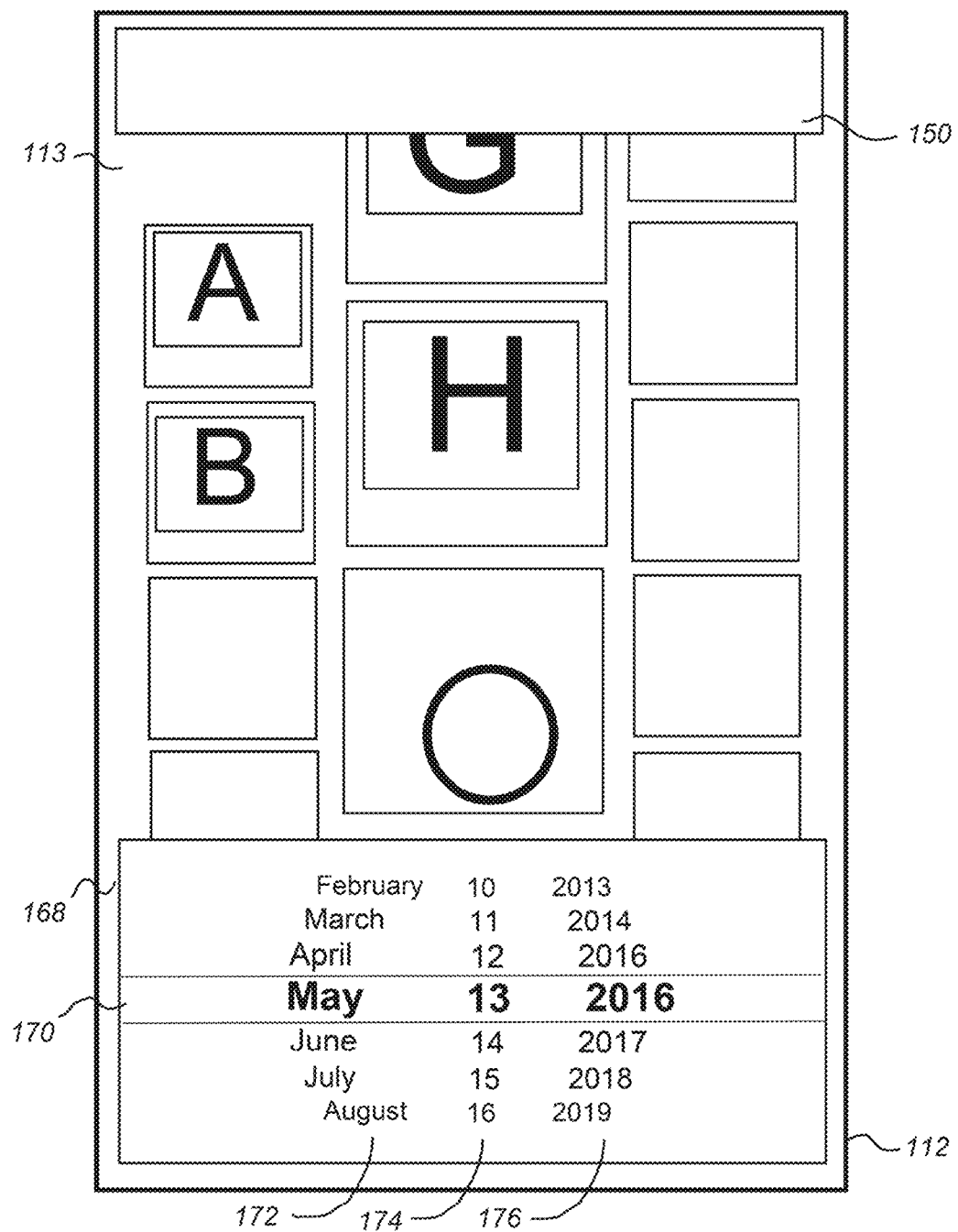

FIG. 3G illustrates one embodiment of a time travel feature interface 168. The time travel interface 168 includes a user-selected time period entry interface 170, a month selector wheel 172, a day selector wheel 174, and a year selector wheel 176. Via the time travel interface 168, a user is permitted to time travel their time-based social network. For example, in the central column of the user interface 113 (FIG. 3A, for example), a sequence of stories associated with Today 130 is presented in a primary focus area. Other stories in contemporaneous time periods are vertically presented in columns shown in the secondary focus areas. A user may horizontally scroll to select a different user-selected time period, or alternatively, the user may enter a time travel feature interface 168. Using the time travel feature, the local fluid timeline social network application 15 is arranged to generate and communicate input directions to change the selected time period to a different selected time period.

In the time travel feature interface 168 of FIG. 3G, the user may innovatively manipulate vertical scroll wheels or some other type of interface in a different embodiment. The vertical scroll wheels implemented via the illustrated month selector wheel 172, day selector wheel 174, and year selector wheel 176 have been found to be very effective. For example, while a user is scrolling any of the selector wheels 172-176, information may be passed from the local fluid timeline social network application 15 to the fluid timeline social network software 22. The fluid timeline social network software 22 is arranged to use this preliminary information to being identifying and building queries to pre-look up a sequence of stories. In this way, the user gains a first benefit of quickly, intuitively, and efficiently traveling in time to create a new user-selected time period. Also in this way, the user gains a second benefit of making a selection (e.g., accepting the time information in the user-selected time period interface 170) and having the user interface 113 quickly transition to columns of stories associated with the newly selected time period. The transition and population of new stories is arranged to occur in real time, and to the user, the presentation of new stories is very quick and may in some cases appear instantaneous.

Figure 3H:
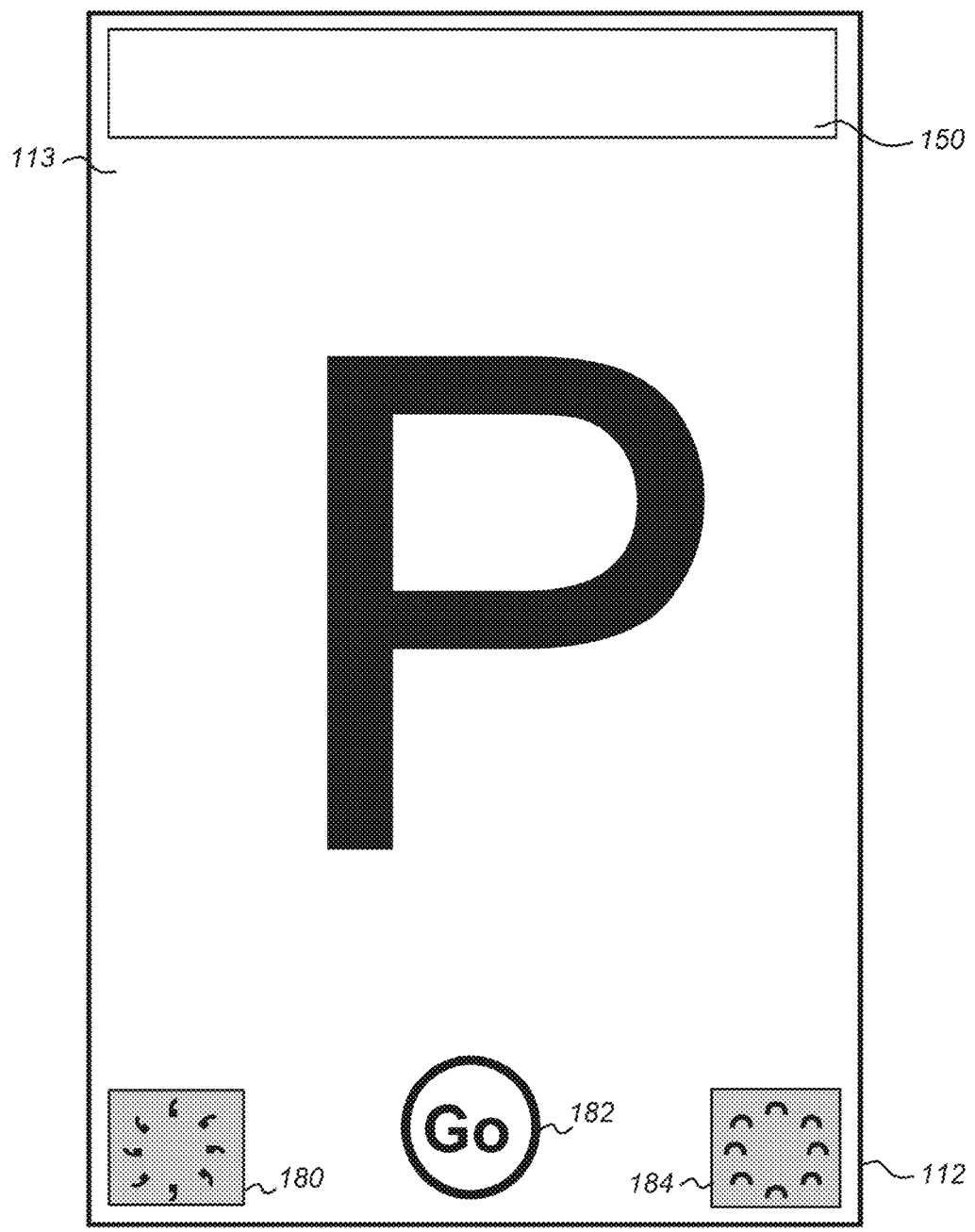

In FIG. 3H, the user has just previously manipulated the selection ring 152 to position it above the fifth icon 164 (FIG. 3E). The selection ring siren 160 indicated that selection of the fifth icon 164 will permit the user to post a new story to the time-based social network, and the user has entered the post feature interface.

In the post feature interface of FIG. 3H, a multimedia function of the computer device 112 has been instantiated. In FIG. 3H, the multimedia function is a camera, but in other cases, the multimedia function may include any one or more of camera input, audio input, tactile input, physiological data (e.g., brain waves, emotional data, biological material sampling data (e.g., urine, saliva, phlegm, etc.), range of motion data, etc.) input, or the like.

The post feature interface of FIG. 3H illustrates a seventh icon 180, an eighth icon 182, and a ninth icon 184. The seventh, eighth and ninth icons 180-184 may be presented as any one or more of graphics, sounds, tactile indicators, or in some other manner. The seventh, eighth and ninth icons 180-184 may be arranged to convey particular information about one or more features associated with the particular icon. In the embodiment of FIG. 3H, the seventh icon 180 is associated with a feature to access locally stored multimedia, the sixth icon 182 is associated with a feature to accept new multimedia input (e.g., snap a picture, record audio/video, capture a motion, etc.), and the ninth icon is associated with another user input interface such as to enter text, for example.

In the embodiment of FIG. 3H, a user may enter the post feature interface, snap a quick photograph using the eighth icon 182, and immediately post the newly captured multimedia to the time-based social network. In addition, or in the alternative, the user may select the seventh icon 180 and select previously captured multimedia, which can also be quickly posted to the time-based social network. Further in addition or in alterative, the user may select the ninth icon 184 and enter text or other multimedia input that is automatically associated with multimedia content that will be posted as a new story. For example, the user may take a picture via cooperative use of the eight icon 182, and then immediately identify the picture with descriptive text or provide some other input or comment via cooperative use of the ninth icon 184. The additional input collected by the computer device 112 may be arranged by the fluid timeline social network software 22 for presentation in the story information area 127 of FIG. 3A.

Figure 4:
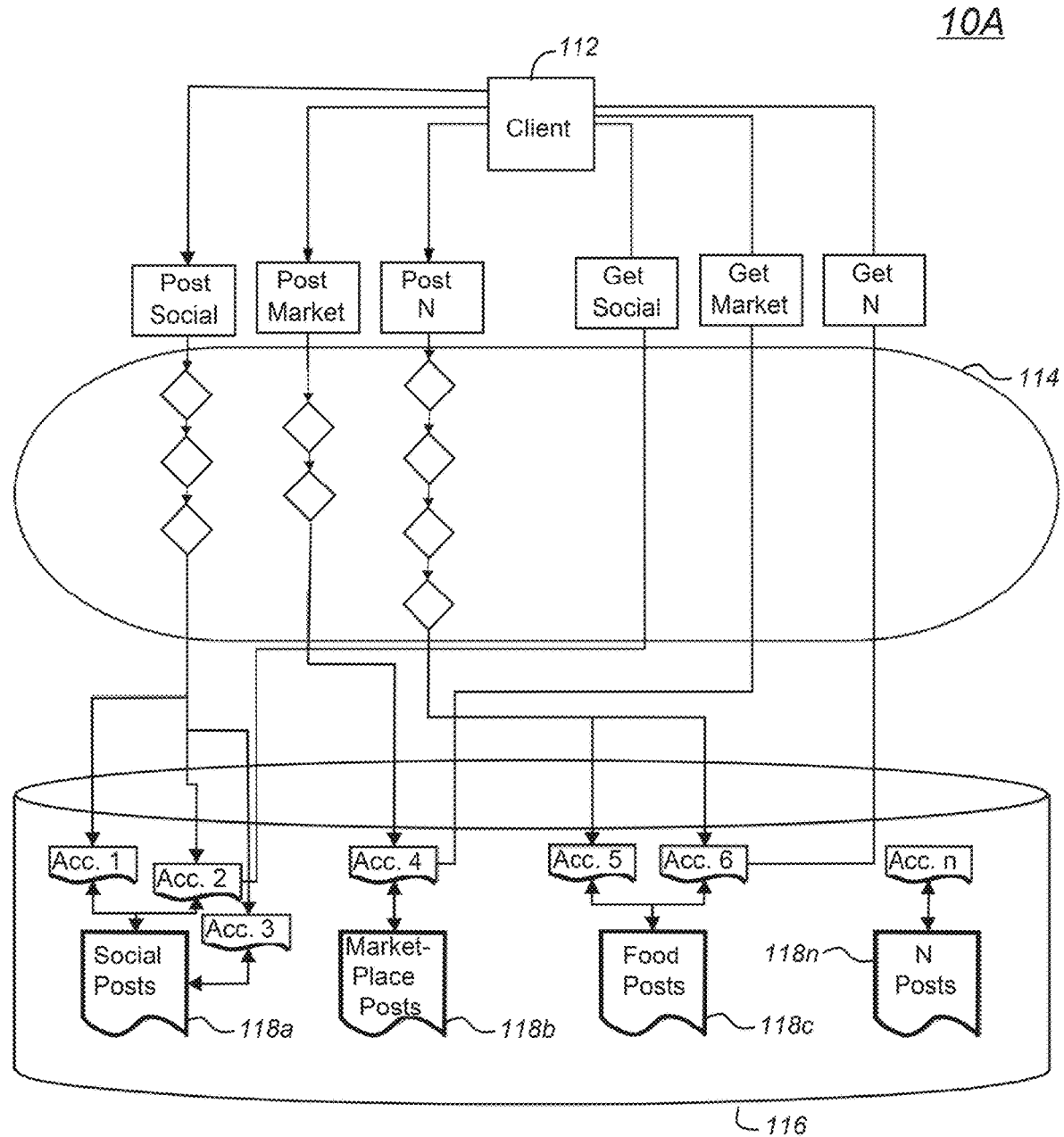
FIG. 4 illustrates an embodiment of a fluid timeline social network system.

FIG. 4 illustrates an embodiment of a fluid timeline social network system 10A. In the system 10A, a client side application executing on a computing device 112 is permitted to post content to different time-based social network feeds. In FIG. 4, four particular feeds are illustrated (i.e., a Social feed, a Marketplace feed, a Food feed, and an Additional feed. The Additional feed may include any other particular contextual feed described in the present disclosure or otherwise contemplated in the time-based social network organizational architecture.

A super structure 114 is implemented to manage the plurality of individual feed subsystems. The super structure 114 manages traffic of the various feeds. Management of the feeds includes separating feed specific information and sharing overlapping feed information. For example, in some cases, story posts belonging to different feeds will share attributes such as a user identifier, a timestamp or created date, and the like. In some cases, story posts belonging to different feeds will have specific attributes such as story posts to a Marketplace feed having a "price" attribute. In some cases, the super structure 114 is implemented as a server-side web application framework that utilizes particular database structures, web service structures, and web page structures. In one case, the super structure 114 is implemented with a single RUBY ON RAILS server having a plurality of workers, services, and multiple instances.

The super structure 114 will also manage other aspects of story posting and retrieval. Posting flow, for example, will differ from one feed to another. For instance, Marketplace may be arranged to only allow "public" or group posts, and Social may be arranged to configurably allow "public" posts, "friends only" posts, "only me" private posts, and the like.

In some cases, posts to various feeds conform to a JAVA SCRIPT OBJECT NOTATION (JSON) format. In these cases, the super structure is arranged to distinguish between the JSON structure of posts belonging to Social feed and the JSON structure of posts belonging to the Marketplace feed, and so on.

In the super structure 114, application programming interface (API) requests are separated from the very beginning. Each feed managed by the super structure 114 has arranged therefore at least one and in some cases many endpoints for story creation (i.e., posting stories), and multiple endpoints to provide data to different feeds (i.e., get or otherwise retrieve stories). In this way, the super structure 114 has at least separate endpoints both for stories creation (i.e., post) and stories retrieval (i.e., get).

Further, by separating the virtual communication paths of each feed, the super structure 114 architecture avoids storing a "type" field that identifies whether a story belongs to one feed or another. On each POST request, the super structure 114 automatically knows where to store the story based on the request path. And on the GET response, the super structure 114 cooperates with the local fluid timeline social network application 15 to knows where the client side will feed a set of stories. Along these lines, each feed supports POST, PUT, DELETE, and GET operations.

In the system 10A, the super structure 114 implements a particular data persistence policy. The super structure 114 stores stories for different feeds into separate database tables, with accessor tables designed specifically to each one of them based on the use cases. The provided API endpoints support the POST, PUT, DELETE, and GET operations of each different feed. In this way, the time-based social network is architected with a specific organization that permits fast, easy, and intuitive extensibility. No other known social network architectures are organized in this manner. When specific commercial, social, educational, governmental, charitable, or other circumstances arise to create new feeds or to delete unused feeds, the super structure 114 can be easily adapted. What's more, the architecture of the fluid timeline social network software 22 allows for easy up-scaling, easy down-scaling, and traffic load balancing of computing hardware resources.

The super structure 114 includes a plurality of a API endpoints for each feed post operation. The various endpoints may are illustrated serially for understanding of the structure, but individual instances operate in parallel for scalability.

A database server architecture 120 works in cooperation with the super structure 114. The database server architecture 120 may include or otherwise have communicative access to the story database 32, image database 34, marketplace database 36, and additional database 38 (FIG. 1). A plurality of accessors 1-$n$ cooperate with a plurality of associated feature and attribute modules 118$a$-$n$ to properly store and retrieve stories in the appropriate database structures.

Figure 5:
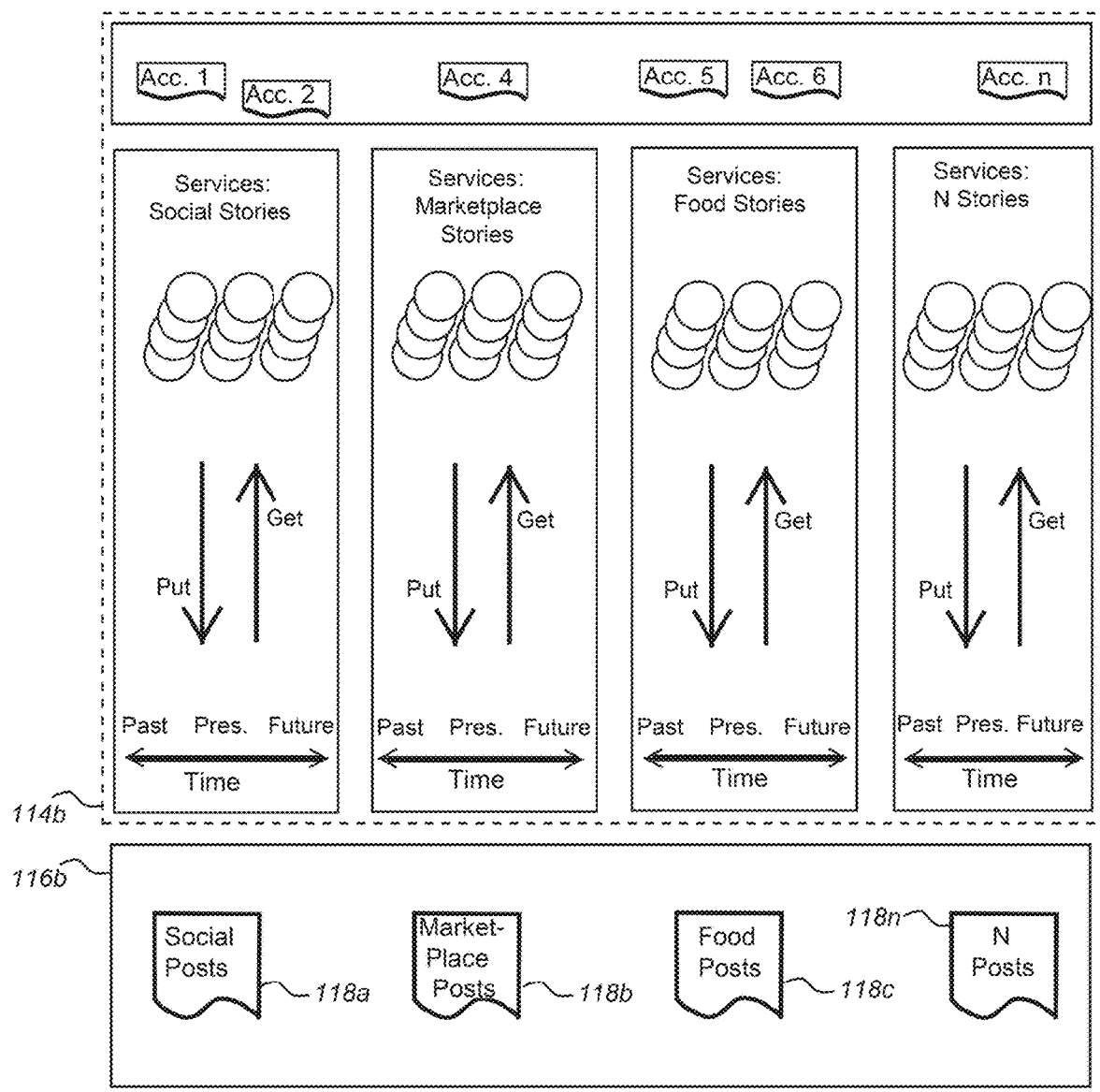
FIG. 5 illustrates another embodiment of a fluid timeline social network system.

FIG. 5 illustrates another embodiment of a fluid timeline social network system 10B. In the system 10B, a plurality of accessors and services cooperate in individual feeds of a second super structure 114$b$ embodiment that is communicatively coupled to a second database server architecture 116$b$.

In the system 10B, each feed is organized as a virtual pipe having dedicated services for past stories, present stories, and future stories. In addition, each feed virtual pipe has dedicated services for time-based POST operations and time-based GET operations. In some embodiments having such specifically targeted services, the time travel feature (FIG. 3G) is arranged to perform pre-lookup database procedures that increase the speed of posting stories and retrieving stories.

Figure 6:
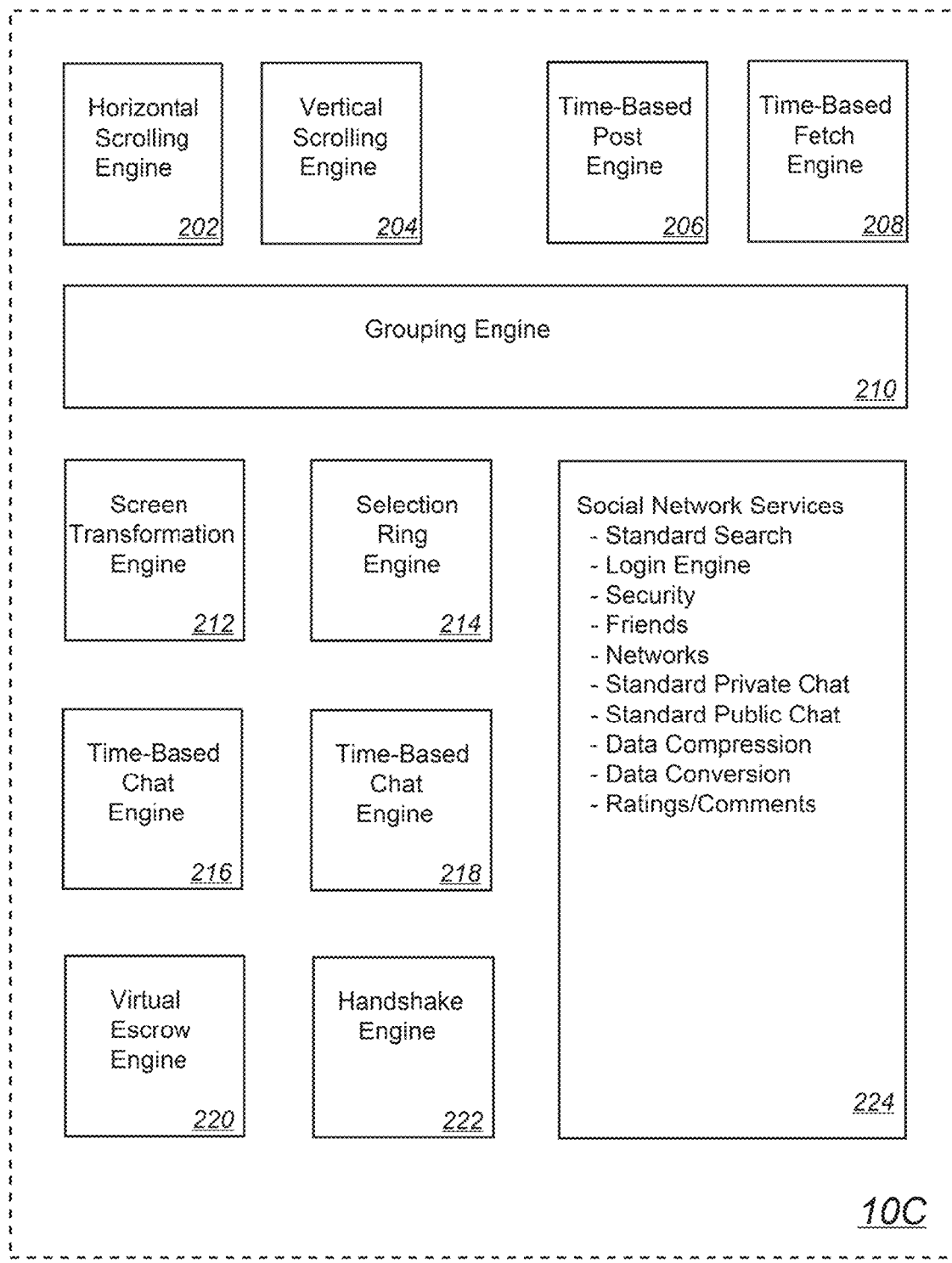
FIG. 6 illustrates yet one more embodiment of a fluid timeline social network system.

FIG. 6 illustrates yet one more embodiment of a fluid timeline social network system 10C. The system 10C is arranged to include a plurality of engine modules including a horizontal scrolling engine 202, a vertical scrolling engine 204, a time-based posting engine 206, and a time-based fetching engine 208. The scrolling, posting, and fetching engines are associated and cooperative with a grouping engine 210. The system 10C is also arranged to include a screen transformation engine 212, a selection ring engine 214, a time-based chat engine 216, a timeline engine 218, a virtual escrow engine 220, and a handshake engine 222. Several social network services are provided in another module 224. The social network services include a standard search function, a login engine, a security module, a "friends" module, a friend networks module, a standard private module, a standard public chat module, a data compression module, a data conversion module, and a ratings/comments module. Other social network services are omitted for brevity.

The horizontal and vertical scrolling engines 202, 204 are arranged for an infinite flow architecture. That is, when a limiting boundary is reached, rather than stopping scrolling, the horizontal and vertical scrolling engines 202, 204 begin again at a terminal point as if the timeline "rolled over." In one example, a story may have several multimedia images. When a user enters the story to view or otherwise consume the content, the user may horizontally scroll through the content, which can be displayed based on time, proximity or in another way. When the scrolling approaches the "last" image, the scrolling engine automatically rolls the view over to re-start at the first image.

The grouping engine 210 is arranged to facilitate user-selection of a time period. For example, a user may want to view stories by day, by week, by month, etc. The grouping engine 210 facilitates the grouping such that a selected time period "group" will seamlessly operate with the horizontal and vertical scrolling engines 202, 204.

The screen transformation engine 212 is arranged to smoothly transition one screen to another screen of presented multimedia content. The appearance on a display is such that one new image gently moves and transforms into an existing image.

The selection ring engine 214 controls the selection ring that is presented via a user interface. The selection ring engine 214 may operate to illuminate hidden icons, shade primary content into a background, and the like. The selection ring engine 214 permits most or all operations of the fluid timeline social network to be operated on a smartphone with one hand, and in particular, with one thumb. That is, the selection ring is positioned on a display such that it may be dragged, dropped, tapped, or otherwise manipulated to generate stories, post stories, scroll, edit user parameters, and the like.

The time-based chat engine 216 facilitates chat features based on a user's timeline. Chat features may be one-to-one, one-to-many, or one-to-all in some embodiments.

A timeline engine 218 is arranged to deliver stories in a sequence selected by a user. In some cases, a sequence of stories is presented based on time such that the most recently posted stories are presented first, and stories posted longer ago are not posted first. In other cases, the timeline engine 218 sequences stories based on geographic location relative to the current location of the mobile device or some other user-selected location. In still other cases, the timeline engine 218 permits the fluid timeline social network software 22 to determine a sequence for the presentation of stories.

A virtual escrow engine 220 and a handshake engine 222 facilitate commercialization opportunities of a time-based social network. For example, selected feeds of the time-based social network may be used to buy and sell merchandise or services between individual users or other entities. In these cases, the virtual escrow engine 220 may permit each party to a transaction to upload the item of value or a representation of the item of value. The item of value may be money, a barcode to a concert ticket, a representation of a title to goods, or any other such representation. The virtual escrow engine 220 may then generate unique computer readable codes (e.g., bar codes, QR codes, or the like). Subsequently, when the parties meet to consummate the transaction, the virtual handshake engine 222 is employed to let each party scan the other parties generated code. When both parties have scanned their respective codes, the items of value are exchanged or otherwise released. Alternatively, if either party does not pursue consummation of the transaction, then each party's item of value is returned to its original owner.

Figure 7:
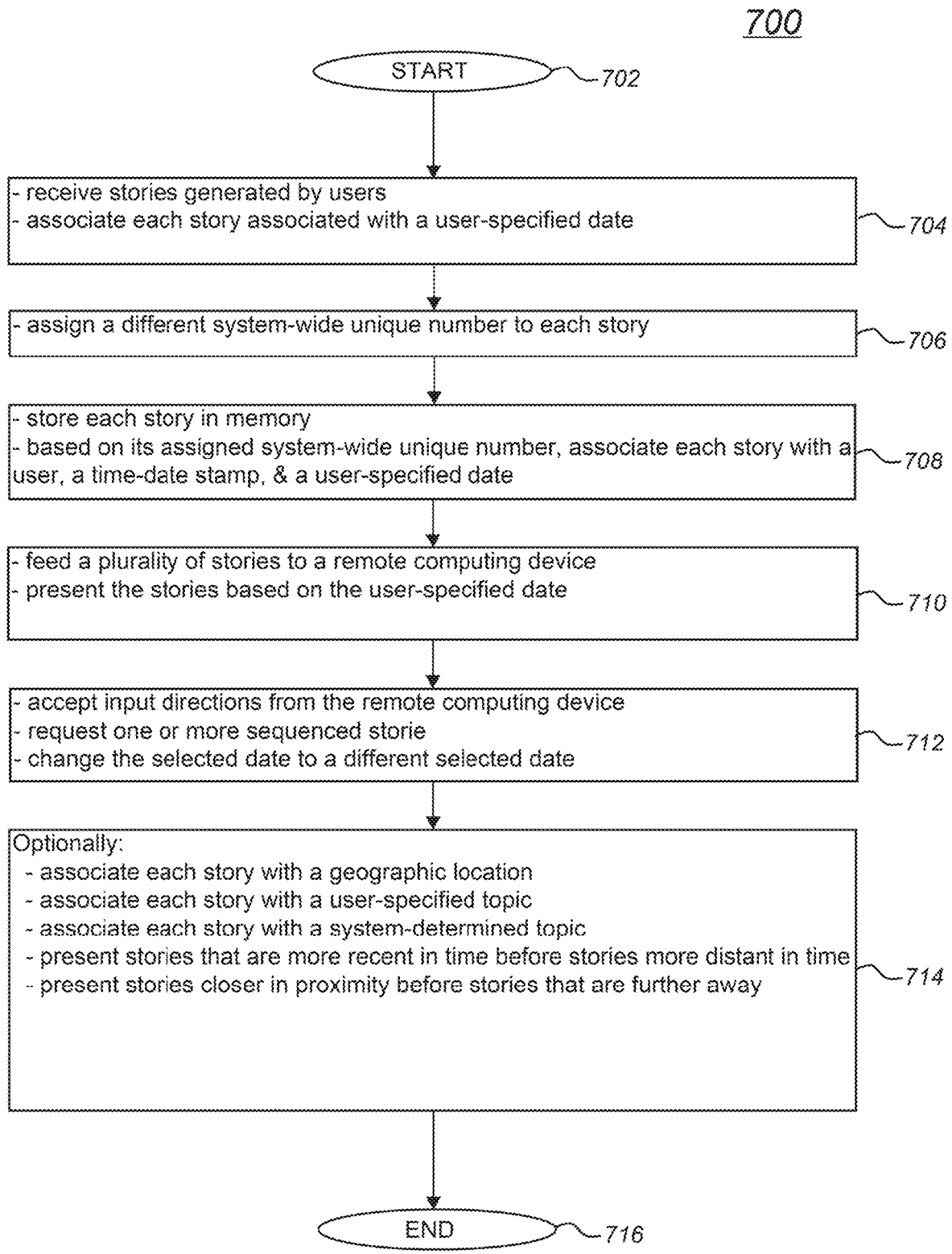
FIG. 7 illustrates a method to organize a time-based social network in a computing server architecture.

FIG. 7 illustrates a method to organize a time-based social network in a computing server architecture 700. The computing server architecture has processor cores arranged to execute instructions stored in an associated memory, and the instructions are directed by requests received from a plurality of remote computing devices.

At 704, a plurality of stories are generated by users of the time-based social network. Each story is associated with a user-specified date. At 706, a different system-wide unique number is assigned to each of the received plurality of stories. Processing passes to 708 wherein each of the received plurality of stories is stored in memory and, based on its assigned system-wide unique number, each of the received plurality of stories is associated with a user, a time-date stamp, and the user-specified date.

At module 710, a plurality of stories are fed to a first user remote computing device. The plurality of stories are arranged for presentation based on the user-specified date. At 712, input directions are accepted from the first user remote computing device. The input directions are arranged to request one or more sequenced stories, each of the one or more sequenced stories associated with a same selected date. The input directions are further arranged to change the selected date to a different selected date.

At 714, optional processing is performed. In some cases, each of the received plurality of stories is stored in memory and further associated with a geographic location. In some cases, each of the received plurality of stories is stored in memory and further associated with a user-specified topic. In some cases, each of the received plurality of stories is stored in memory and further associated with a system-determined topic. In some cases, the sequenced stories are sequenced based on the time-date stamp and stories that are more recent in time are fed before stories that are more distant in time. In some cases, the sequenced stories are sequenced based on a current reported location of the first user remote computing device and stories that are closer in proximity to the current reported location are fed before stories that are further away from the current reported location.

Processing of the method to organize a time-based social network in a computing server architecture may end at 716. In some cases, processing begins again at 702 or 704. In some cases, processing of the method to organize a time-based social network in a computing server architecture does not end.

Figure 8:
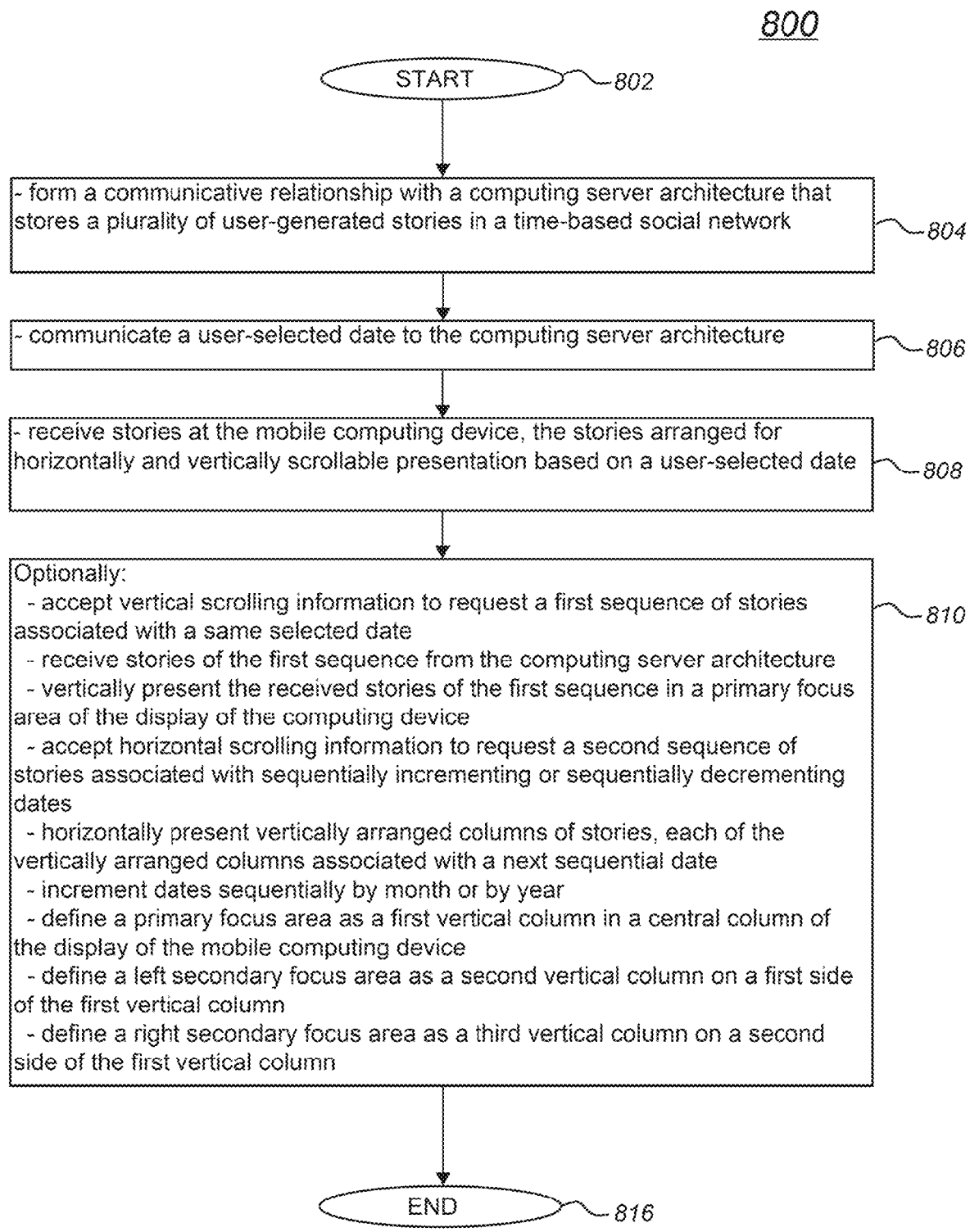
FIG. 8 illustrates a method to interact with a time-based social network that is arranged to operate in a computing server architecture using a mobile computing device.

FIG. 8 illustrates a method to interact with a time-based social network that is arranged to operate in a computing server architecture using a mobile computing device 800. The mobile computing device has at least one processor arranged to execute instructions stored in a non-transitory computer readable media associated with the at least one processor.

Processing begins at 802.

At 804, a communicative relationship is formed with a computing server architecture. The computing server architecture is arranged to access a database architecture that stores a plurality of stories generated by users of the time-based social network. Each story of the plurality of stories is associated with a user-specified date. At 806, a user-selected date is communicated to the computing server architecture, and at 808, the mobile computing device receives a plurality of stories. The plurality of stories is arranged for horizontally and vertically scrollable presentation based on the user-selected date.

Optional processing is performed at module 810. In some cases, the plurality of stories is presented based on the user-selected date such that stories associated with the user-selected date are vertically presented in a primary focus area of a display of the mobile computing device and stories not associated with the user-selected date are vertically presented in one or more secondary focus areas of the display of the mobile computing device. In some cases, vertical scrolling information is accepted, and the vertical scrolling information is arranged to request a first sequence of stories. Here, each story of the first sequence is associated with a same selected date, and received stories of the first sequence are vertically presented in the primary focus area of the display of the mobile computing device.

In some cases of the optional processing at 810, horizontal scrolling information is accepted. The horizontal scrolling information is arranged to request one or more second sequences of stories. The one or more second sequences is associated with sequentially incrementing dates or sequentially decrementing dates. In this case, a plurality of vertically arranged columns of stories is horizontally presented on the display of the mobile computing device. Each of the vertically arranged columns is associated with a next sequential date. In some of these cases, the sequentially incrementing dates are sequentially incrementing by month or by year such that each sequential vertically arranged column includes stories of a next sequential month or a next sequential year, respectively.

In still some other cases of the optional processing at 810, the plurality of stories are presented in the primary focus area as a first vertical column in a central column of the display of the mobile computing device. Here, a left secondary focus area is a second vertical column arranged on a first side of the first vertical column and a right secondary focus area is a third vertical column arranged on a second side of the first vertical column. The second side is opposite the first side.

Processing of the method to interact with a time-based social network that is arranged to operate in a computing server architecture using a mobile computing device may end at 816. In some cases, processing begins again at 802 or 804. In some cases, processing of the method to interact with a time-based social network that is arranged to operate in a computing server architecture using a mobile computing device does not end.

As used in the present disclosure, the term "module" refers to an application specific integrated circuit (ASIC), an electronic circuit, a processor and a memory operative to execute one or more software or firmware programs, combinational logic circuitry, or other suitable components (hardware, software, or hardware and software) that provide the functionality described with respect to the module.

A processing core, or a processor (i.e., a processing unit), as used in the present disclosure, refers to one or more processing units individually, shared, or in a group, having one or more execution units, and such processing cores and processors include central processing units (CPUs), digital signal processors (DSPs), microprocessors, micro controllers, state machines, and the like that execute instructions.

In the present disclosure, memory may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

As known by one skilled in the art, a computing device such as computing server 20 (FIG. 1) has one or more memories, and each memory comprises any combination of transitory and non-transitory, volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. Some or all of the stored contents of a memory may include software instructions executable by a processing device to carry out one or more particular acts.

A computing device such as computing server 20 (FIG. 1) and computer devices 12, 12a-n, 112 may further include operative software found in a conventional computing devices such as an operating system, software drivers to direct operations through input/output (I/O) circuitry, networking circuitry, and other peripheral component circuitry. In addition, a computing server may include operative application software such as network software for communicating with other computing devices, database software for building and maintaining databases, and task management software for distributing the communication and/or operational workload amongst various processing units. These computing devices further include fluid timeline social network software and a local fluid timeline social network application, respectively. When so arranged as described herein with the particular software that implements some or all of the time-based social network described herein, each computing device is transformed from a generic and unspecific computing device to a tangible, non-abstract combination device comprising hardware and software configured for a specific and particular purpose.

Certain figures presented herein are flowcharts illustrating processes that may be used by embodiments of the local fluid timeline social network application 15 and the fluid timeline social network software 22. In this regard, each described process may represent a module, segment, or portion of code, which comprises one or more executable instructions for implementing the specified logical function (s). It should also be noted that in some implementations, the functions noted in the process may occur in a different order, may include additional functions, may occur concurrently, and/or may be omitted.

In some cases, computing devices embodied herein are a single hardware machine having the hardware and software listed herein, and in other cases, the computing devices are a networked collection of hardware and software machines working together in a server farm to execute the functions of the time-based social network. The conventional hardware and software is not shown in the present figures for simplicity.

In some cases, computing server 20 is a production computing server. The production computing server 20 is deployed in a real world environment to communicate website pages over the Internet. The computing server 20 can read and write data from associated databases 32, 34, 36, 38 as directed by the program code of the fluid timeline social network software 22 and the operations directed by a user of a computer device 12, 12a-n, 112.

Figures herein illustrate software components loaded into memory of a computing device. Each software component may include one or more computer programs or may be part of a larger computer program. Alternatively or in addition, each software component may include data or other computational support material for the fluid timeline social network software 22 or the local fluid timeline social network application 15.

Memory of the computing devices may store an operating system. The operating system typically provides program and device management services for the computing device. Examples of operating systems include any one or more of various versions of LINUX, MICROSOFT WINDOWS, UNIX, and others.

Memory may store web page management and administration tools. For example, memory may optionally store one or more web server modules, database server interface modules, script processor modules, and web browser modules. Examples of web server modules include APACHE, MICROSOFT INTERNET INFORMATION SERVICES (IIS), NGINX, and GOOGLE WEB SERVER (GWS). Web servers typically deliver web pages to client devices. Often, the requests are made using Hypertext Transfer Protocol (HTTP), and the web pages are delivered as Hypertext Markup Language (HTML) documents or JAVA SCRIPT documents along with any additional content that is called out by the document (e.g., images, style sheets, scripts, functions, and the like).

Examples of database server interface modules include ORACLE/SUN MICROSYSTEM MYSQL, MICROSOFT SQL SERVER, and APACHE DERBY. A database server interface module typically implements a structured query language (SQL) that performs input and output functions on a relational database. In some cases, a database server interface module implements a data storage repository (e.g., a relational database) in the same hardware that implements the database server (e.g., story database 32, image database 34, marketplace database 36, additional database 38), and in other cases, the repository is distributed between several different machines. In some cases, the data repository is implemented in a single database computing server.

A script processor is a computing module that interprets and executes instructions of a scripting language. PHP is one example of a scripting language. MICROSOFT ACTIVE SERVER PAGES (ASP) is another example. In some cases, the scripting language is embedded into the HTML source code of a web page, and interpreted by the script processor module.

Web browser examples include MICROSOFT INTERNET EXPLORER, GOOGLE CHROME, MOZILLA FIREFOX, and APPLE SAFARI.

The terms, "real-time" or "real time," as used herein and in the claims that follow, are not intended to expressly imply instantaneous processing, transmission, reception, or otherwise as the case may be. Instead, the terms, "real-time" and "real time" imply that the activity occurs over an acceptably short period of time (e.g., over a period of microseconds or milliseconds), and that the activity may be performed on an ongoing basis (e.g., identification and retrieval of story data being triggered during the middle of a user-selected time period operation (FIG. 3G)). An example of an activity that is not real-time is one that occurs over an extended period of time (e.g., hours or days) or that occurs only after intervention or direction by a person or other activity.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

The headings and Abstract of the Disclosure provided herein are for convenience only and do not limit or interpret the scope or meaning of the embodiments.

The present invention may be understood more readily by reference to the disclosed detailed description of the preferred embodiments of the invention. It is to be understood that the terminology used herein is for the purpose of describing specific embodiments only and is not intended to be limiting. It is further to be understood that unless specifically defined herein, the terminology used herein is to be given its traditional meaning as known in the relevant art.

As may be appreciated by persons having ordinary skill in the art, aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Application Ser. No. 62/334,318 filed May 10, 2016, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

receiving, at a computing server, a plurality of stories generated by users of a time-based social network, wherein each story has a user-specified date and a creation date;

presenting, to a user computing device for display, a browsing mode having a plurality of columns of stories, wherein each of the plurality of columns is associated with a different time period;

receiving, at the computing server from the user computing device, a first time period based on a user's horizontal scrolling input of the plurality of columns of stories in the browsing mode, wherein a first central column of the plurality of columns is associated with the first time period;

selecting, by the computing server, a first subset of stories from the plurality of stories having the user-specified date associated with the selected first time period;

selecting, by the computing server, a second subset of stories from the plurality of stories having the user-specified date associated with a second time period prior to the selected first time period;

selecting, by the computing server, a third subset of stories from the plurality of stories having the user-specified date associated with a third time period after the selected first time period;

sending, from the computing server to the user computing device, the first subset of stories to be presented in the first central column of the plurality of columns in a reading mode, wherein the first subset of stories are ordered vertically based on the creation date of each story in the first subset of stories, and wherein the first central column is vertically scrollable in the reading mode with respect to a second column and a third column of the plurality of columns;

sending, from the computing server to the user computing device, the second subset of stories to be presented in the second column left of the first central column in the reading mode, wherein the second subset of stories are ordered vertically in the reading mode based on the creation date of each story in the second subset of stories; and sending, from the computing server to the user computing device, the third subset of stories to be presented in the third column right of the first central column in the reading mode, wherein the third subset of stories are ordered vertically in the reading mode based on the creation date of each story in the third subset of stories.

2. The method of claim 1, further comprising:

prior to receiving the first time period, presenting, to the user computing device for display, a browsing mode having a plurality of icons representing the plurality of columns of stories; and receiving, at the computing server from a user computing device, the first time period based on the user's horizontal scrolling input of the plurality of icons, wherein a central icon of the plurality of icons is associated with the first time period.

3. The method of claim 2 further comprising:
presenting, to the user computing device for display, a reading mode having the plurality of columns of stories.

4. The method of claim 1, wherein sending the first subset of stories to the user computing device to be presented includes:
sequencing the first subset of stories based on a geographical location of each story associated with the first subset of stories relative to a current location of the user computing device; and
feeding, to the user computing device, the first subset of stories to be presented in the first central column based on the geographical location sequencing where stories that are closer in proximity to the current location of the user computing device are fed before stories that are further away from the current location of the user computing device.

5. The method of claim 1, wherein sending the first subset of stories to the user computing device to be presented includes:
sequencing the first subset of stories based on a user-specific topic of each story associated with the first subset of stories; and
feeding, to the user computing device, the first subset of stories to be presented in the first central column based on the sequenced user-specific topic.

6. The method of claim 1, wherein each different time period associated with the plurality of columns is an incremental sub time period sequenced by day.

7. The method of claim 1, wherein each different time period associated with the plurality of columns is an incremental sub time period sequenced by month.

8. A method, comprising:
establishing, by a user computing device, a communicative relationship with a computing server that stores a plurality of stories generated by users of a time-based social network, wherein each story of the plurality of stories has a user-specified date and a creation date;
presenting, by the user computing device, a browsing mode having a plurality of icons arranged along a horizontal timeline, wherein each of the plurality of icons is associated with a different time period;
receiving, at the user computing device, a first time period from a user based on the user's horizontal scrolling input of the plurality of icons, wherein a central icon of the plurality of icons is associated with the first time period;
sending, from the user computing device to the computing server, the first time period for a first subset of stories from the plurality of stories having the user-specified date associated with the first time period;
receiving, at the user computing device from the computing server, the first subset of stories, a second subset of stories from the plurality of stories having the user-specified date associated with a second time period relative to the first time period; and
presenting, by the user computing device, a reading mode having a plurality of columns of stories to the user, including:
presenting the first subset of stories in a central column of the plurality of columns, wherein the first subset of stories are ordered vertically based on the creation date of each story in the first subset of stories, and wherein the central column is vertically scrollable with respect to at least one non-central column of the plurality of columns;
presenting the second subset of stories in the at least one non-central column, wherein the second subset of stories are ordered vertically based on the creation date of stories in the second subset of stories.

9. The method of claim 8, wherein presenting the reading mode to the user includes:
presenting the first subset of stories in the central column using images of a first size; and
presenting the second subset of stories in the at least one non-central column using images of a second size that are smaller than the first size.

10. The method of claim 8, wherein presenting the first subset of stories to the user includes:
sequencing the first subset of stories based on a geographical location of each story associated with the first subset of stories relative to a current location of the user computing device; and
presenting the first subset of stories in the vertically scrollable central column based on the geographical location sequencing where stories that are closer in proximity to the current location of the user computing device are presented before stories that are further away from the current location of the user computing device.

11. The method of claim 8, wherein presenting the first subset of stories to the user includes:
sequencing the first subset of stories based on a user-specific topic of each story associated with the first subset of stories; and
presenting the first subset of stories in the vertically scrollable central column based on the sequenced user-specific topic.

12. A time-based social network architecture, comprising:
a story database to store stories generated by users of a time-based social network; and
a server computer that includes:
at least one processor that executes computer instructions; and
a memory that stores the computer instructions that, when executed by the at least one processor, cause the at least one processor to:
receive from a first user computer device a created story and a creation date;
receive from the first user computer device a user-specified date to be associated with the created story;
store the created story in associated with the user-specified date and the creation date in the story database;
receive, from a second user computer device, a request for stories for a first time period, wherein the first time period is selected based on a user's horizontal scrolling input of a plurality of columns of stories in a browsing mode, wherein each of the plurality of columns is associated with a different time period and a first central column of the plurality of columns is associated with the first time period;
select a first plurality of stories having the user-specified date associated with the selected first time period, a second plurality of stories having the user-specified date associated with a second time period sequentially earlier than the selected first time period, and a third plurality of stories having the user-specified date associated with a third time period sequentially later than the selected first time period, wherein the created story is included in one of the first, second, or third plurality of stories;

deliver the first plurality of stories to the second user computer device to be presented in a column arrangement in a reading mode with the first plurality of stories being presented in the first central column and ordered vertically based on the creation date of each story in the first plurality of stories, wherein the first central column is vertically scrollable with respect to a second column and a third column of the plurality of columns;

deliver the second plurality of stories to the second user computer device to be presented in the column arrangement in the reading mode with the second plurality of stories being presented in the second column left of the first central column and ordered vertically based on the creation date of each story in the second plurality of stories; and deliver the third plurality of stories to the second user computer device to be presented in the column arrangement in the reading mode with the third plurality of stories being presented in the third column right of the first central column and ordered vertically based on the creation date of each story in the third plurality of stories.

13. The time-based social network architecture of claim 12, wherein the computer instructions that, when executed by the at least one processor, cause the at least one processor to deliver the first, second, and third plurality of stories to the second user computer device by further causing the at least one processor to:

sequence the first, second, and third pluralities of stories based on a user selected topic of each story; and deliver the sequenced first, second, and third pluralities of stories to the second user computer device to be presented based on the user selected topic.

14. The time-based social network architecture of claim 12, wherein the computer instructions that, when executed by the at least one processor, cause the at least one processor to deliver the first, second, and third plurality of stories to the second user computer device by further causing the at least one processor to:

sequence the first, second, and third pluralities of stories based on a geographical location associated with each story; and deliver the sequenced first, second, and third pluralities of stories to the second user computer device to be presented vertically based on the geographical location sequencing where stories that are closer in proximity to a current location of the second user computing device are presented before stories that are further away from the current location of the second user computing device.

15. A non-transitory processor-readable storage medium that stores computer instructions that, when executed by a processor on a computer, cause the processor to perform actions, the actions comprising:

presenting a browsing mode having a plurality of icons representing a plurality of columns of stories to a user;

receiving a selected first time period from the user in which to access a plurality of subset of stories of a plurality of stories generated by users of a time-based social network, each story of the plurality of stories is associated with a user-specified date and a creation date, wherein the first time period is selected based on the user's horizontal scrolling input of the plurality of icons in the browsing mode, wherein a central icon of the plurality of icons is associated with the first time period;

accessing a first subset of stories from the plurality of stories having the user-specified date associated with the selected first time period;

accessing a second subset of stories from the plurality of stories having the user-specified date associated with a second time period prior to or after the selected first time period; and presenting the plurality of subsets of stories to the user in a column arrangement in a reading mode, including:

presenting the first subset of stories in the central column of the plurality of columns, wherein the first subset of stories are ordered vertically based on the creation date of each story in the first subset of stories, and wherein the central column is vertically scrollable with respect to at least one non-central column; and presenting the second subset of stories in the at least one non-central column, wherein the second subset of stories are ordered vertically based on the creation date of stories in the second subset of stories.

* * * * *